(12) United States Patent
Seki

(10) Patent No.: US 7,835,040 B2
(45) Date of Patent: Nov. 16, 2010

(54) OPTICAL SCANNING APPARATUS AND IMAGE FORMING APPARATUS

(75) Inventor: Yuichi Seki, Saitama (JP)

(73) Assignee: Canon Kabushiki Kaisha (JP)

( * ) Notice: Subject to any disclaimer, the term of this patent is extended or adjusted under 35 U.S.C. 154(b) by 934 days.

(21) Appl. No.: 11/678,685

(22) Filed: Feb. 26, 2007

(65) Prior Publication Data

US 2007/0201110 A1    Aug. 30, 2007

(30) Foreign Application Priority Data

Feb. 27, 2006   (JP)   .............................. 2006-051170

(51) Int. Cl.
*H04N 1/04* (2006.01)
(52) U.S. Cl. ........................ 358/481; 358/474; 358/475; 358/511
(58) Field of Classification Search .................. 358/481, 358/474, 475, 511
See application file for complete search history.

(56) References Cited

FOREIGN PATENT DOCUMENTS

| JP | 08-068956 A | 3/1996 |
|----|-------------|--------|
| JP | 11-202232 A | 7/1999 |

*Primary Examiner*—Houshang Safaipour
(74) *Attorney, Agent, or Firm*—Rossi, Kimms & McDowell LLP

(57) ABSTRACT

This invention is an optical scanning apparatus comprises a plurality of beam generating units adapted to generate beams; an optical unit adapted to collimate axes of the beams generated by the plurality of beam generating units to scan at intervals corresponding to a recording direction along a image bearing member; a detection unit adapted to detect a beam interval between the plurality of beams collimated by the optical unit; a driving unit adapted to change the beam interval by driving the optical unit; a first control unit adapted to drive/control the driving unit so as to make the detected beam interval become a predetermined value; and a second control adapted to drive/control the driving unit in accordance with a rotation position of the image bearing member.

7 Claims, 19 Drawing Sheets

(SENSOR LAYOUT)

(EQUIVALENT CIRCUIT)

OPTICAL SCANNING APPARATUS AND IMAGE FORMING APPARATUS

BACKGROUND OF THE INVENTION

1. Field of the Invention

The present invention relates to an optical scanning apparatus which forms a latent image by scanning on an image bearing member (e.g., a photosensitive drum) with a plurality of laser beams modulated by an image signal and, more particularly, to an optical scanning apparatus for controlling the interval between main scanning lines formed by a plurality of semiconductor lasers and an image forming apparatus which incorporates the optical scanning apparatus.

2. Description of the Related Art

There is available an image forming apparatus which forms a latent image by modulating laser beams emitted from a plurality of semiconductor lasers with an image signal and raster-scanning the laser beams on an image bearing member using a scanner motor. Such a multi-beam image forming apparatus scans a plurality of raster lines (scanning lines) in parallel with a plurality of laser beams emitted from a plurality of laser devices. When an optical unit which synthesizes a plurality of laser beams deforms due to a temperature variation, the interval between a plurality of laser beams (to be referred to as a beam interval) on an image bearing member changes. As a consequence, the interval between scanning lines on the image bearing member which are formed by these beams also changes. A beam interval variation occurs independently of a sub-scanning amount (to be referred to as a sub-scanning pitch) per main scanning which is provided by the rotation of the photosensitive drum. For this reason, unevenness occurs in the interval between scanning lines (to be referred to as a scanning line interval) on the photosensitive drum which are formed by different scans. For example, as the beam interval increases, the interval between the scanning lines formed by the beams increases. In contrast to this, the interval between the lowermost scanning line of a plurality of scanning lines in one scan and the uppermost scanning line of a plurality of scanning lines in the immediately succeeding scan decreases. Note that scanning line interval unevenness will be referred to as line pitch unevenness.

Under the circumstances, there has been proposed a technique of suppressing a beam interval variation due to thermal expansion by forming a holder, on which laser devices are mounted, and an optical box, in which a rotating polygon mirror, an optical lens, and the like are mounted, by using materials having almost the same thermal expansion coefficient (see, for example, patent reference 1). There has also been proposed a method of finely adjusting a beam interval by using a prism for adjustment (see, for example, patent reference 2).

There has also been proposed an apparatus including an optical system (optical unit synthesizing motor) which can automatically adjust a beam interval when converting a plurality of laser beams into parallel light beams at a predetermined interval. This method uses a beam interval sensor to detect the beam interval between a plurality of applied laser beams. A motor rotation amount calculation circuit determines the rotation amount of the optical unit synthesizing motor on the basis of the difference between the beam interval detected by the beam interval sensor and a predetermined value (e.g., with 1,200 dpi, d=21.17 [μm]), thereby controlling the optical unit synthesizing motor to make the beam interval become a predetermined value.

[Patent Reference 1] Japanese Patent Laid-Open No. 11-202232

[Patent Reference 2] Japanese Patent Laid-Open No. 8-68956

The above conventional techniques cannot, however, correct a sub-scanning pitch unevenness caused by the rotation unevenness of the image bearing member or driving motor (transfer belt motor or drum motor). For this reason, the interval between scanning lines formed by one laser beam varies in accordance with sub-scanning pitch unevenness, and the scanning line interval varies for every number of beams forming multi-beams. That is, scanning line interval unevenness occurs.

In addition, the linear velocity of the surface of an image bearing member varies due to gradual wear and tear caused by the long-term use of the member, and the moving distance of the image bearing member in the sub-scanning direction varies even if it is driven/controlled with constant rotation. With this variation, the sub-scanning pitch changes over time, and unevenness occurs.

SUMMARY OF THE INVENTION

The present invention has been made in consideration of the prior art described above, and has as its object to solve the above problems. More specifically, it is an object of the present invention to provide an optical scanning apparatus and an image forming apparatus which can correct scanning line interval unevenness caused by a beam interval variation and main-scanning line interval unevenness due to the rotation unevenness of an image bearing member by feeding back a correction amount for the beam interval variation and a correction amount for correcting the main scanning line interval unevenness to a correction amount calculation circuit.

In order to achieve the above object, the present invention has the following arrangement. There is provided an optical scanning apparatus comprising:

a plurality of beam generating units adapted to generate beams;

an optical unit adapted to collimate axes of the beams generated by the plurality of beam generating units to scan at intervals corresponding to a recording direction along a image bearing member;

a detection unit adapted to detect a beam interval between the plurality of beams collimated by the optical unit;

a driving unit adapted to change the beam interval by driving the optical unit;

a first control unit adapted to drive/control the driving unit so as to make the detected beam interval become a predetermined value; and a second control adapted to drive/control the driving unit in accordance with a rotation position of the image bearing member.

As described above, the present invention has an effect of reducing scanning line interval unevenness due to a scanning line interval variation caused by the rotation unevenness of an image bearing member.

The present invention also has an effect of reducing scanning line interval unevenness due to a scanning line interval variation caused by a peripheral velocity variation due to deterioration of an image bearing member from long term use.

Further features of the present invention will become apparent from the following description of exemplary embodiments (with reference to the attached drawings).

DESCRIPTION OF THE EMBODIMENTS

First Embodiment

Figure 1:
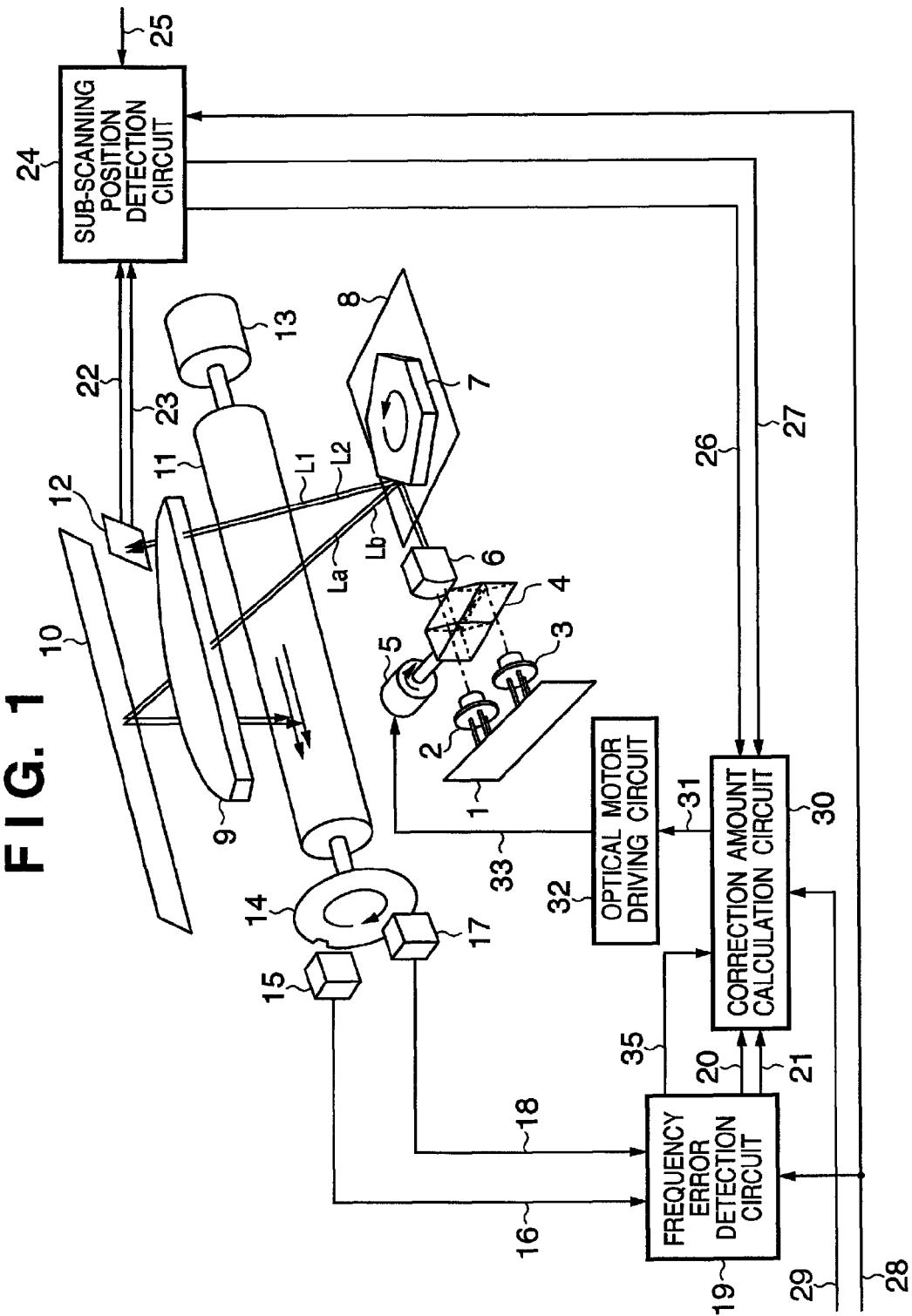
FIG. 1 is a view showing the arrangement of an image forming apparatus including an optical apparatus according to the first embodiment.

FIG. 1 is a view showing the arrangement of an image forming apparatus including an optical scanning unit according to this embodiment. Reference numeral 1 denotes a laser driving circuit which drives a semiconductor laser 2 and a semiconductor laser 3 to emit light. An optical unit 4 receives a laser beam L1 emitted from the semiconductor laser 2 and a laser beam L2 emitted from the semiconductor laser 3 in a non-image area. The light beams emitted from the semiconductor laser 2 and semiconductor laser semiconductor laser 3 are not parallel light beams in the sub-scanning direction.

The optical unit 4 comprises a prism. The optical unit 4 reflects a laser beam from the semiconductor laser 3 twice by using a prism to output the laser beam as a beam which is parallel to a laser beam from the semiconductor laser 2 at a desired interval in the vertical direction in FIG. 1 (i.e., the sub-scanning direction on the photosensitive drum), Note that a predetermined interval may be provided between the two light beams in a direction along the main scanning line. In this embodiment, however, for the sake of descriptive simplicity, assume that there is no shift between them in the main scanning direction. An optical motor unit 5 rotates/drives the optical unit 4. The optical motor unit 5 has a rotating shaft in a direction perpendicular to a plane including a plurality of light beams converted into parallel light beams by the optical unit 4 (light beams within the optical unit 4). This changes the elevation angle (or depression angle) of the reflecting surface of the optical unit 4 and controls the height of each beam emerging from the optical unit 4. This controls the beam interval between a plurality of light beams. An optical motor driving circuit 32 drives/controls the optical motor unit 5.

Laser beams pass through the optical unit 4 and reach a rotating polygon mirror 7 through a cylindrical lens 6. A rotating polygon mirror driving circuit 8 including a scanner motor rotates the rotating polygon mirror 7 at a uniform angle velocity. When the laser beams reach the rotating polygon mirror 7, the rotating polygon mirror 7 deflects them, and an f-θ lens 9 further deflects them so as to make the linear velocities of beam scanning on a photosensitive drum 11 uniform. This apparatus includes a scanning position sensor 12 at a position where it can receive the laser beams L1 and L2 which pass through the f-θ lens 9 and do not strike the image area of the photosensitive drum. The scanning position sensor 12 has the arrangement shown in FIGS. 4A and 4B, and detects the respective multi-beams (two beams in this case).

A sub-scanning position detection circuit 24 receives an output signal 22 from the scanning position sensor 12. The sub-scanning position detection circuit 24 outputs a sub-scanning difference signal 26 indicating the amount of shift from the proper value of a beam interval and a scanning determination signal 27 indicating the sign of the shift amount, i.e., the direction of shift. A correction amount calculation circuit 30 receives these signals.

A reflecting mirror 10 reflects two laser beams La and Lb after emergence from the f-θ lens 9 to apply the laser beams on the photosensitive drum 11. The surface of the photosensitive drum 11 is charged in advance, and electric charge is lost at positions where the laser beams are applied, thereby forming an electrostatic latent image. The apparatus develops the latent image formed on the photosensitive drum 11 with toner, and transfers and fixes the toner image on a paper sheet, thereby forming a permanent image on the sheet.

A rotation detection signal generating unit 14 (to be abbreviated as an FG generating unit hereinafter) is, for example, a disk-like member placed coaxially with the rotating shaft of the photosensitive drum 11. This member has an equidistant pattern of rectangles for detecting a rotation frequency, which are formed on a portion near the periphery. The member also has a detection hole for detecting a write position. A write position sensor 15 (to be abbreviated as an HP sensor) comprises a light-emitting unit and a light-receiving unit, and optically detects the detection hole of the FG generating unit 14. The HP sensor 15 outputs a write position signal 16 (to be abbreviated as an HP signal hereinafter) to a frequency error detection circuit 19 upon detecting the detection hole. A rotation sensor 17 (to be abbreviated as an FG sensor hereinafter) comprises, for example, a Hall element and the like, and outputs an FG signal 18 to the frequency error detection circuit 19 upon detecting a change in current flowing in the equidistant pattern of the FG generating unit 14. Alternatively, the rotation sensor 17 may have an arrangement for optically detecting the equidistant pattern.

The frequency error detection circuit 19 outputs a velocity determination signal 20 which goes to high level when the rotational velocity of the photosensitive drum 11 is higher than a reference value, and goes to low level when the rotational velocity is lower than the reference value. When the velocity shifts from the reference value, the frequency error detection circuit 19 also outputs a frequency error signal 21 indicating the shift amount. In addition, the frequency error detection circuit 19 shapes the HP signal 16 and outputs the resultant signal as a detection start signal 35.

The correction amount calculation circuit 30 calculates the number of moving steps of the optical motor unit 5 and outputs the resultant signal as a motor control signal 31. The optical motor driving circuit 32 drives the optical motor unit 5 in accordance with the input motor control signal 31 to rotate the optical unit 4 so as to move the position of each emerging light beam in the direction of the height, thereby changing the beam interval on the photosensitive drum 11.

[Outline of Operation of Frequency Error Detection Circuit]

Figure 2:
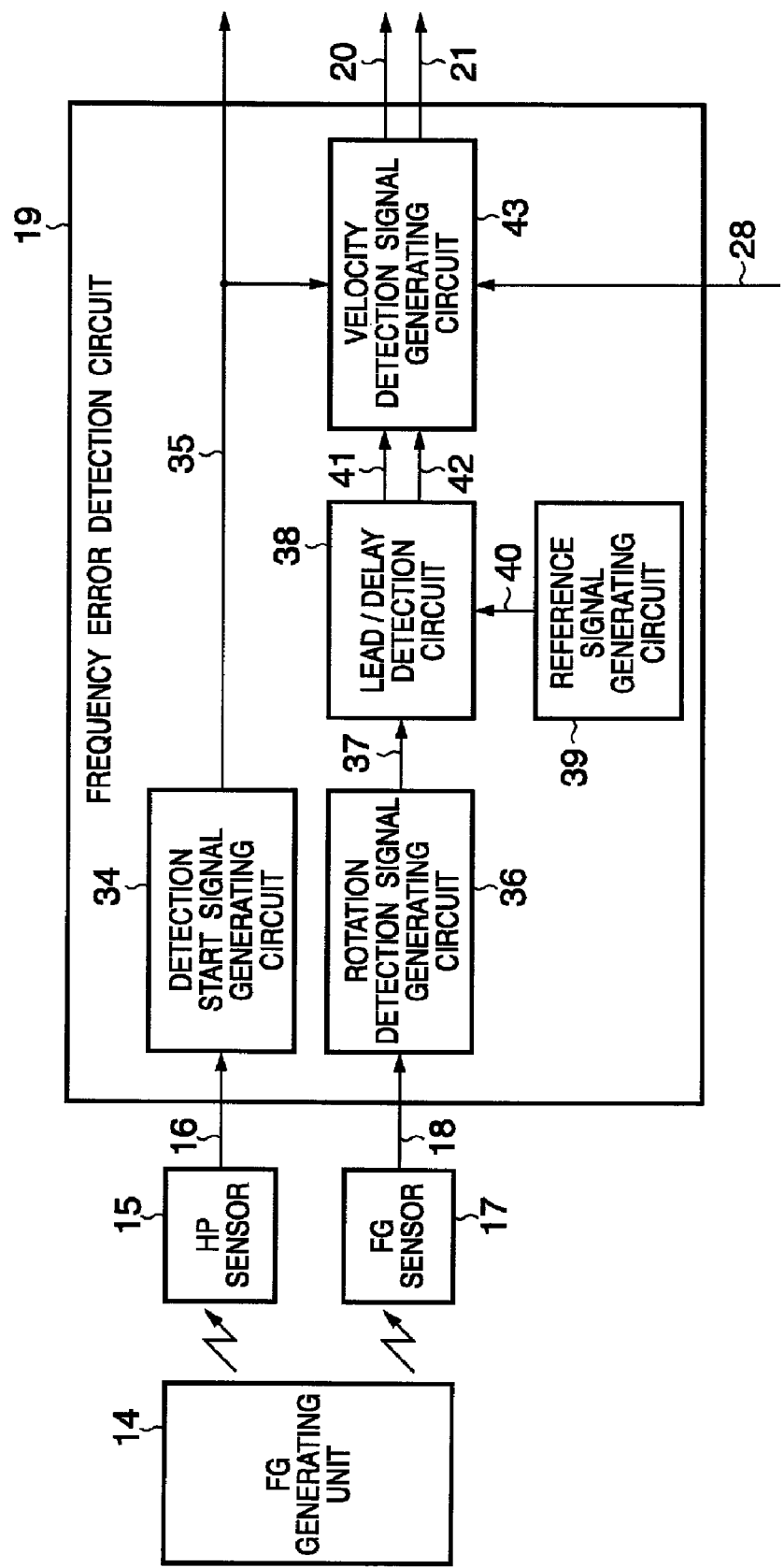
FIG. 2 is a main block diagram of a frequency error calculation circuit according to the first embodiment.

FIG. 2 is a main block diagram showing the frequency error detection circuit 19 and its peripheral circuit according to the first embodiment. The rotation detection signal generating unit 14 (to be abbreviated as the FG generating unit hereinafter) is, for example, a disk-like member placed coaxially with the rotating shaft of the photosensitive drum 11. This member has an equidistant pattern of rectangles for detecting a rotation frequency, which are formed on a portion near the periphery. The member also has a detection hole for detecting a write position. The write position sensor 15 (to be abbreviated as the HP sensor) comprises a light-emitting unit and a light-receiving unit. The HP sensor 15 outputs the write position signal 16 (to be abbreviated as the HP signal hereinafter) to the frequency error detection circuit 19 upon detecting the detection hole. The rotation sensor 17 (to be abbreviated as the FG sensor hereinafter) comprises, for example, a Hall element and the like, and outputs the FG signal 18 to the frequency error detection circuit 19 upon detecting a change in current flowing in the pattern of the FG generating unit 14 upon rotation. The arrangement of the frequency error detection circuit 19 will be described below.

A detection start signal generating circuit 34 shapes the HP signal 16 output from the HP sensor 15 to obtain the detection start signal 35. The detection start signal 35 is a signal serving as a start point of the execution of frequency error calculation.

A rotation detection signal generating circuit 36 outputs a rotation detection signal 37 obtained by shaping an FG signal into a rectangular wave. A lead/delay detection circuit 38 compares the period of a reference signal 40 (to be referred to as a reference period), which is a rectangular wave input from a reference signal generating circuit 39 and having a reference frequency, with the period of the rotation detection signal 37. If the period of the rotation detection signal 37 is shorter than the period of the reference signal 40, the lead/delay detection circuit 38 determines a lead, and outputs a lead signal 41. If the period of the rotation detection signal 37 is longer than the period of the reference signal 40, the lead/delay detection circuit 38 determines a delay, and outputs a delay signal 42. The lead signal 41 and the delay signal 42 are respectively signals indicating a lead amount (time) and a delay amount (time) by using pulse widths. A manner of obtaining a lead/delay will be described with reference to FIG. 3

A velocity detection signal generating circuit 43 comprises a counter and counts the pulse width of the lead signal 41 or delay signal 42 by using a counter clock 28 input from an image formation control unit (not shown). The velocity detection signal generating circuit 43 is reset every time the detection start signal 35 is input, i.e., per rotation of the photosensitive drum. The velocity detection signal generating circuit 43 outputs the count value as the frequency error signal 21. The velocity detection signal generating circuit 43 outputs the velocity determination signal 20 which is at "H" while the lead signal 41 is output, and is at "L" while the delay signal 42 is output.

Figure 3:
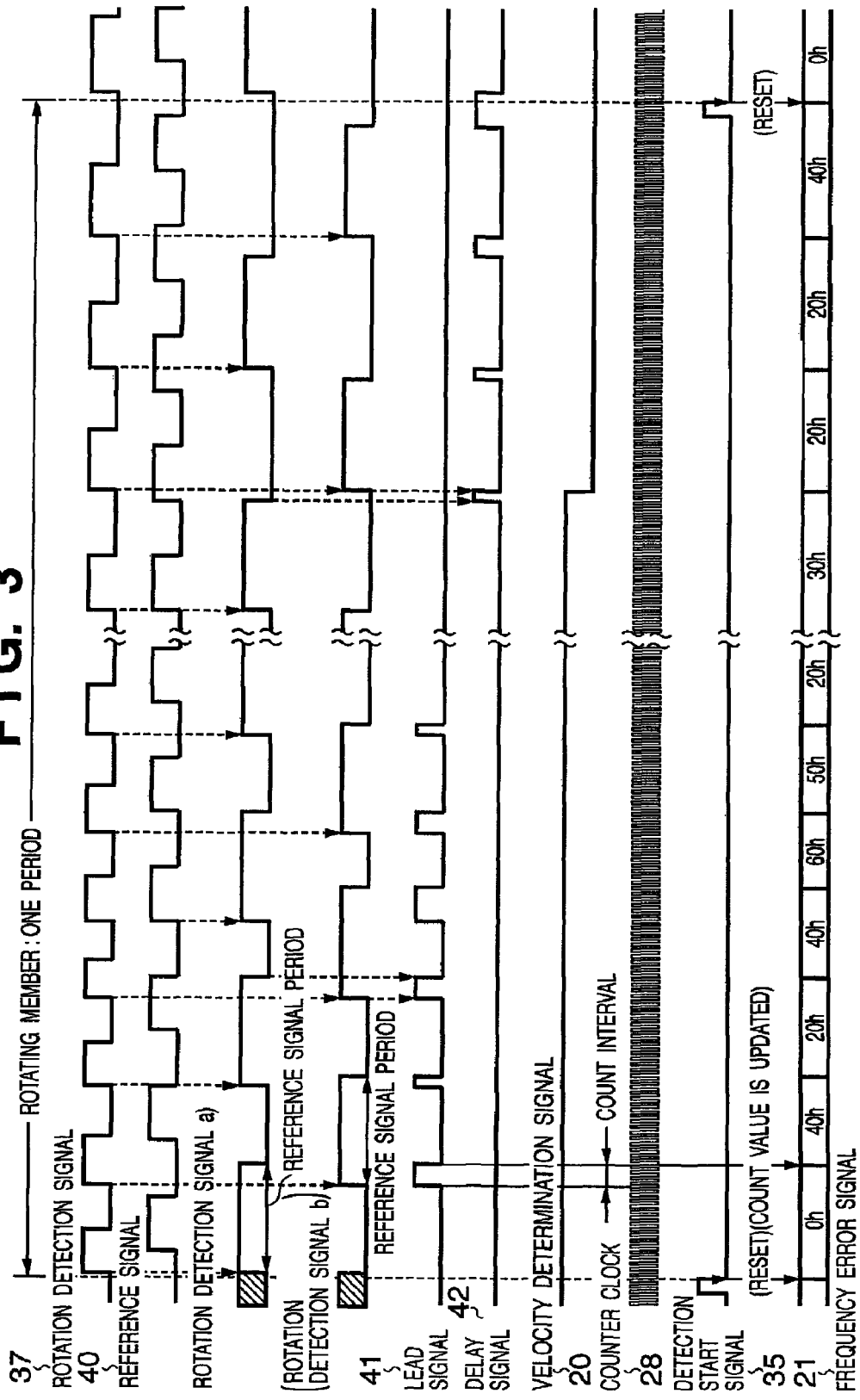
FIG. 3 is a timing chart of the frequency error calculation circuit according to the first embodiment.

FIG. 3 is a timing chart showing signals from the frequency error detection circuit 19 in the first embodiment. The rotation detection signal generating circuit 36 generates a rotation detection signal $\underline{a}$ which is frequency-divided by two at an odd-numbered pulse edge (a leading edge in FIG. 3) of the rotation detection signal 37 and is kept at "H" for the duration of one period of the reference signal 40 from the leading edge of the signal. The rotation detection signal generating circuit 36 also generates a rotation detection signal b which is frequency-divided by two at an even-numbered pulse edge (a leading edge) of the rotation detection signal 37 and is kept at "H" for the duration of one period of the reference signal 40 from the leading edge of the signal. If the rotation detection signal 37 is stable at the same period as that of the reference signal, the phase of the rotation detection signal $\underline{a}$ shifts from the phase of the rotation detection signal b by 180°. That is, in this case, one of the rotation detection signal $\underline{a}$ and the rotation detection signal b is at high level and the other is at low level at some moment other than an edge. Consequently, the period shift between the rotation detection signal 37 and the reference signal 40 appears as the phase shift between the rotation detection signal $\underline{a}$ and the rotation detection signal b. Therefore, the lead/delay detection circuit 38 outputs, as the lead signal 41, a signal representing the interval in which both the rotation detection signal $\underline{a}$ and the rotation detection signal b are at "H" (i.e., the product of the two signals). The lead/delay detection circuit 38 also outputs, as the delay signal 42, a signal representing the interval in which both the rotation detection signal $\underline{a}$ and the rotation detection signal b are at "L" (i.e., the inversion of the sum of the two signals). The intervals in which the lead signal 41 and the delay signal 42 are at "H" represent a lead amount and a delay amount, respectively.

The velocity detection signal generating circuit 43 outputs the velocity determination signal 20 which is at "H" while the lead signal 41 is output, and at "L" while the delay signal 42 is output. The velocity detection signal generating circuit 43 also outputs the frequency error signal 21 representing the value obtained by counting the interval of "H" of the lead signal 41 or delay signal 42 by using the counter clock 28. The velocity detection signal generating circuit 43 is reset every time the detection start signal 35 is output.

[Outline of Operation of Sub-Scanning Position Detection Circuit]

<Arrangement of Operation Position Sensor>

Figure 4A:
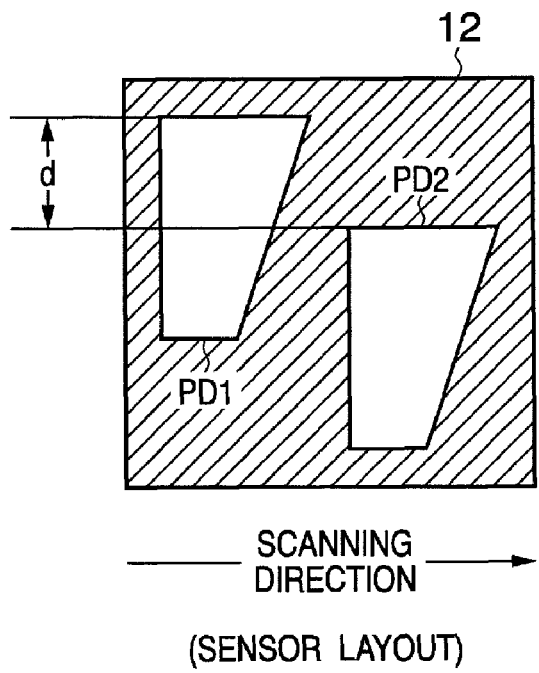
FIG. 4A is a view showing the sensor layout of a scanning position sensor according to the first embodiment.
Figure 4B:
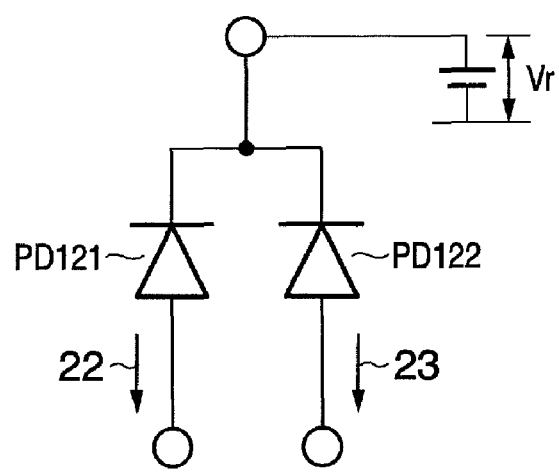
FIG. 4B is an equivalent circuit diagram of the scanning position sensor according to the present invention.

FIG. 4A is a view showing the sensor layout of the scanning position sensor 12 according to the first embodiment. FIG. 4B is an equivalent circuit diagram of the scanning position sensor 12. The scanning position sensor 12 comprises a photosensor (PD) 121 and a photosensor (PD) 122. This is because the scanning position sensor 12 corresponds to two beams. The scanning position sensor 12 can also detect three or more beams by additionally including photosensors having the same shape as that of the photosensors shown in FIG. 4A and arranging them at beam intervals d.

The photosensor 121 is equal in shape and size to the photosensor 122. They are arranged along an axis almost perpendicular to the beam scanning direction at an interval d. Each photosensor has a trapezoidal shape having upper and lower sides parallel to the beam scanning direction in this embodiment. The interval d is a proper scanning line pitch, which is set to about 42.34 [µm] when the resolution is 600 dpi, and is set to about 21.17 [µm] when the resolution is 1,200 dpi. Each photosensor may be a triangular shape. Alternatively, in contras to the shape in FIG. 4A, each photosensor may have a shape having a longer upper side or having no right angle. It is important that the length of each sensor in the beam scanning direction differs in accordance with the position where a beam passes over the sensor. It is also important that the difference between the distances that two beams pass over the two sensors allows to uniquely specify a beam interval. The simplest shape that satisfies these conditions is a trapezoidal or triangular shape which this embodiment uses.

According to the circuit arrangement of the equivalent circuit shown in FIG. 4B, the photosensor 121 corresponds to the photodiode (PD) 121, and the photosensor 122 corresponds to the photodiode (PD) 122. The respective photodiodes connect to each other to have a common cathode, to which a bias voltage Vr is applied. The photodiodes 121 and 122 respectively output the output signals 22 and 23 upon receiving laser beams.

<Arrangement of Sub-Scanning Position Detection Circuit>

Figure 5:
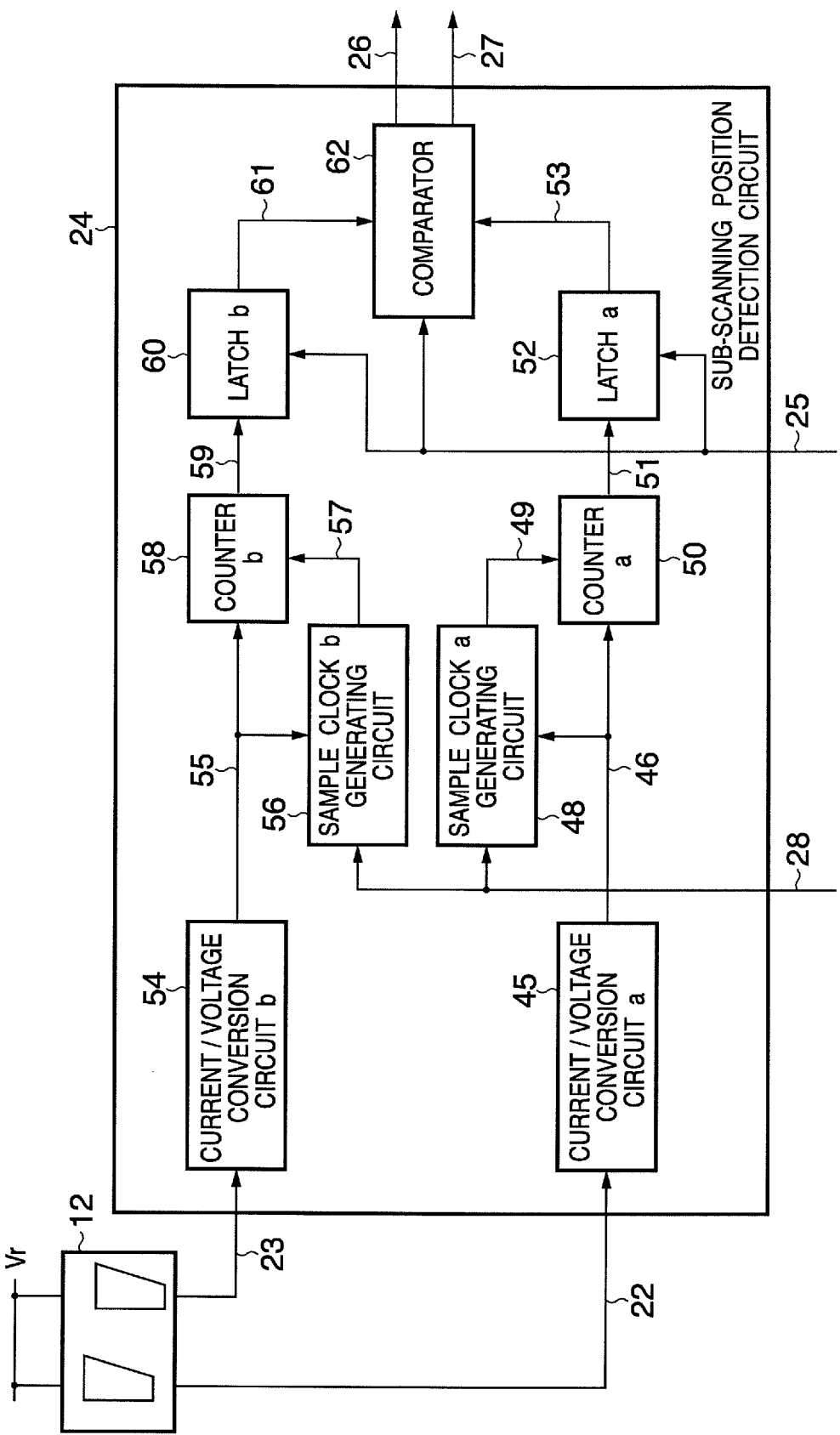
FIG. 5 is a main block diagram of a sub-scanning position detection circuit according to the first embodiment.

FIG. 5 is a block diagram showing the arrangement of the sub-scanning position detection circuit 24 in the first embodiment. The sub-scanning position detection circuit 24 receives the photosensor 1 output signal 22 while the photosensor 121 receives the laser beam La. A current/voltage conversion circuit a 45 converts this signal into voltage to generate a gate signal a 46. That is, the gate signal a 46 is a signal which is at H level while a laser beam is applied to the photosensor 121.

A sample clock a generating circuit 48 comprises a frequency modulation circuit and a phase synchronization circuit, and generates a sample clock a 49 which has the same frequency as that of the counter clock 28 and is synchronized with the gate signal a 46. A counter a 50 counts the interval in which the gate signal a 46 is input by using the sample clock a 49, and outputs a counter a output signal 51 to a latch a 52. The latch a 52 holds the counter a output signal 51 in response to a latch signal 25 input from the image formation control unit (not shown). A comparator 62 receives the value of the counter a output signal 51 held in response to the latch signal 25 as a latch a output signal 53.

Likewise, the sub-scanning position detection circuit 24 receives the photosensor 2 output 23 from the scanning position sensor 12 when the photosensor 122 receives the laser beam La. A current/voltage conversion circuit a 54 converts this signal into voltage to generate a gate signal b 55. That is, the gate signal b 55 is a signal which is at H level while a laser beam is applied to the photosensor 122.

A sample clock b generating circuit 56 comprises a frequency modulation circuit and a phase synchronization circuit, and generates a sample clock b 57 which has the same frequency as that of the counter clock 28 and is synchronized with the gate signal b 55. A counter b 58 counts the interval in which the gate signal b 55 is input using the sample clock b 57, and outputs a counter b output signal 59 to a latch b 60. The latch b 60 holds the counter b output signal 59 in response to the latch signal 25 input from the image formation control unit (not shown). The comparator 62 receives the value of the counter b output signal 59 held in response to the latch signal 25 as a latch b output signal 61.

<Operation of Sub-Scanning Position Detection Circuit>

Figure 6:
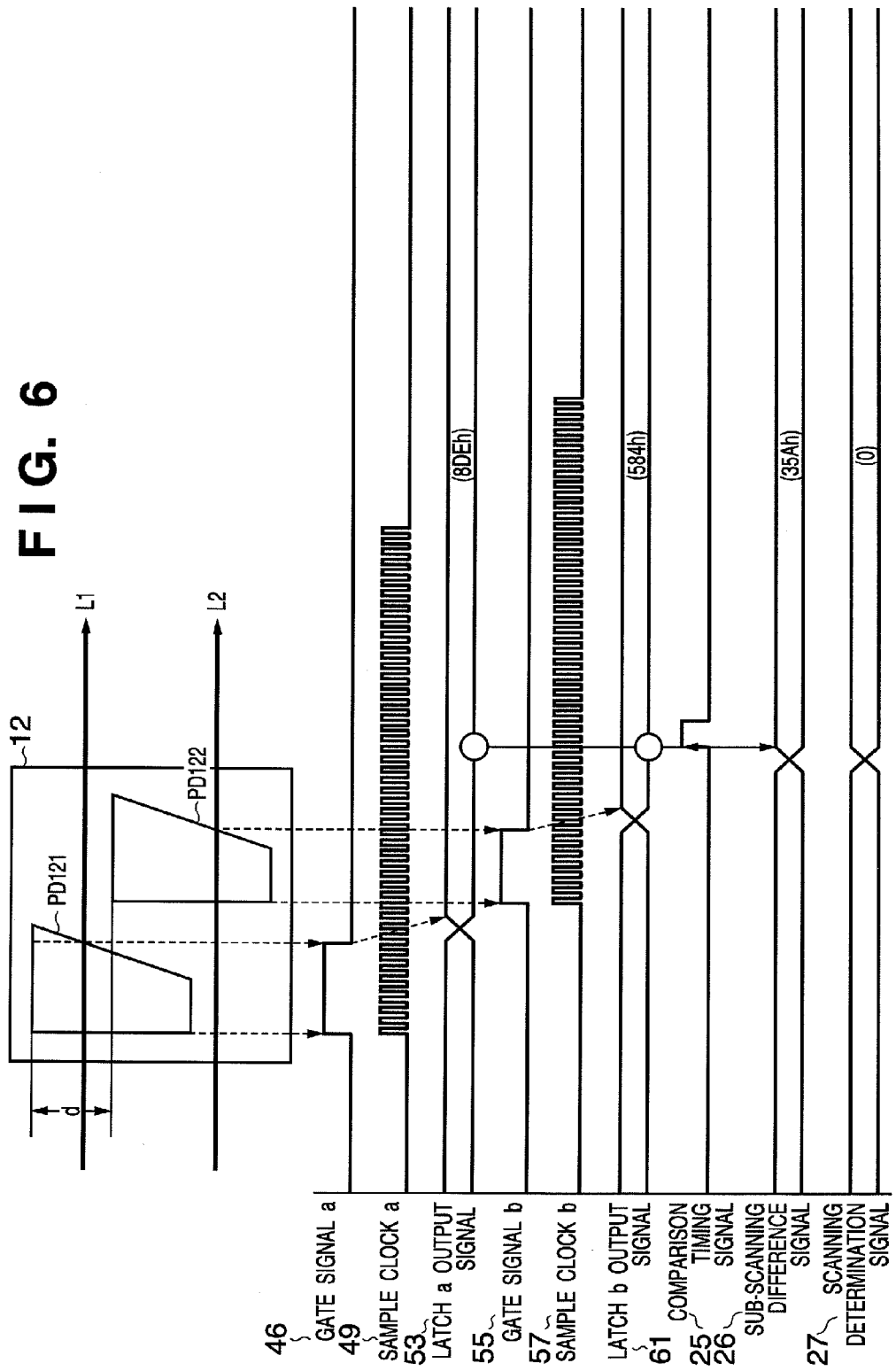
FIG. 6 is a timing chart of the sub-scanning position detection circuit according to the first embodiment.

FIG. 6 is a timing chart showing the operation of the sub-scanning position detection circuit 24 in the first embodiment. The following is a case wherein the scanning position sensor 12 detects two laser beams (L1 and L2).

The gate signal a 46 rises at the timing when the first beam L1 starts striking the photosensor 121 of the scanning position sensor 12, and falls at the timing when the first beam L1 finishes striking the photosensor 121. The sub-scanning position detection circuit 24 outputs the gate signal a 46 in the interval during which the first beam is applied. The counter a 50 counts the interval during which the gate signal a 46 is at high level by using the sample clock a 49 which is synchronized with the leading edge of the gate signal a 46, and outputs the counter a output signal 51. The latch a 52 holds the counter a output signal 51 at the trailing edge of the gate signal a 46. The sub-scanning position detection circuit 24 updates the latch a output signal 53 every time the gate signal a 46 is output (rises). For this reason, the period of the latch signal 25 preferably coincides with the period of main scanning. It suffices to output the sample clock a 49 in the interval of "H" of the gate signal a 46.

Likewise, the gate signal b 55 rises at the timing when the second beam L2 starts striking the photosensor 122 of the scanning position sensor 12, and falls at the timing when the second beam L2 finishes striking the photosensor 122. The sub-scanning position detection circuit 24 outputs the gate signal b 55 in the interval during which the second beam is applied. The counter b 58 counts the interval during which the gate signal b 55 is at high level by using the sample clock b 57 which is synchronized with the leading edge of the gate signal b 55, and outputs the counter b output signal 59. It suffices to output the sample clock b 57 in the interval of "H" of the gate signal b 55.

The comparator 62 compares the latch a output signal 53 with the latch b output signal 61 at the timing of the leading edge of a comparison timing signal (i.e., latch signal 25), and outputs the difference as the sub-scanning difference signal 26. The sub-scanning difference signal 26 represents the absolute value of the difference obtained by the comparator 62. The sub-scanning position detection circuit 24 outputs a positive/negative sign as the scanning determination signal 27.

Assume that the frequency of the sample clock a 49 is 50 [MHz], and the interval of "H" of the gate signal a 46 is 45.4 [µs]. In this case, the value of the latch a output signal 53 is 8DEh (h represents a hexadecimal number). When the interval of "H" of the gate signal b 55 is 28.2 [µs], the value of the latch b output signal 61 is 584h. This value gives the sub-scanning difference signal 26 as follows:

value of sub-scanning difference signal 26=(value of latch $a$ output signal 53)−(value of latch $b$ output signal 61)=8$DE$h−584h=35$A$h In this case, since the difference value is positive, the scanning determination signal 27 is a positive value, for example, at low level.

In contrast to this, if the value of the latch a output signal 53 is 584h and the value of the latch b output signal 61 is 8DEh, the difference value is represented by (584h−8DEh)=CA6h. Since this difference value is negative, the sub-scanning position detection circuit 24 outputs 35Ah, which is the absolute value of the difference value, as the sub-scanning difference signal 26. In this case, the scanning determination signal 27 is a negative value, for example, at high level.

When the beam interval between the laser beams L1 and L2 coincides with the interval d between the photosensor 121 and the photosensor 122, the scanning distances of the respective beams on each sensor become equal. This is because the photosensors are equal in shape and direction, and are spaced from each other by the distance d in a direction perpendicular to the beam scanning direction. Therefore, the value of the sub-scanning difference signal 26 is 0.

<Correction Amount Calculation Circuit>

Figure 7:
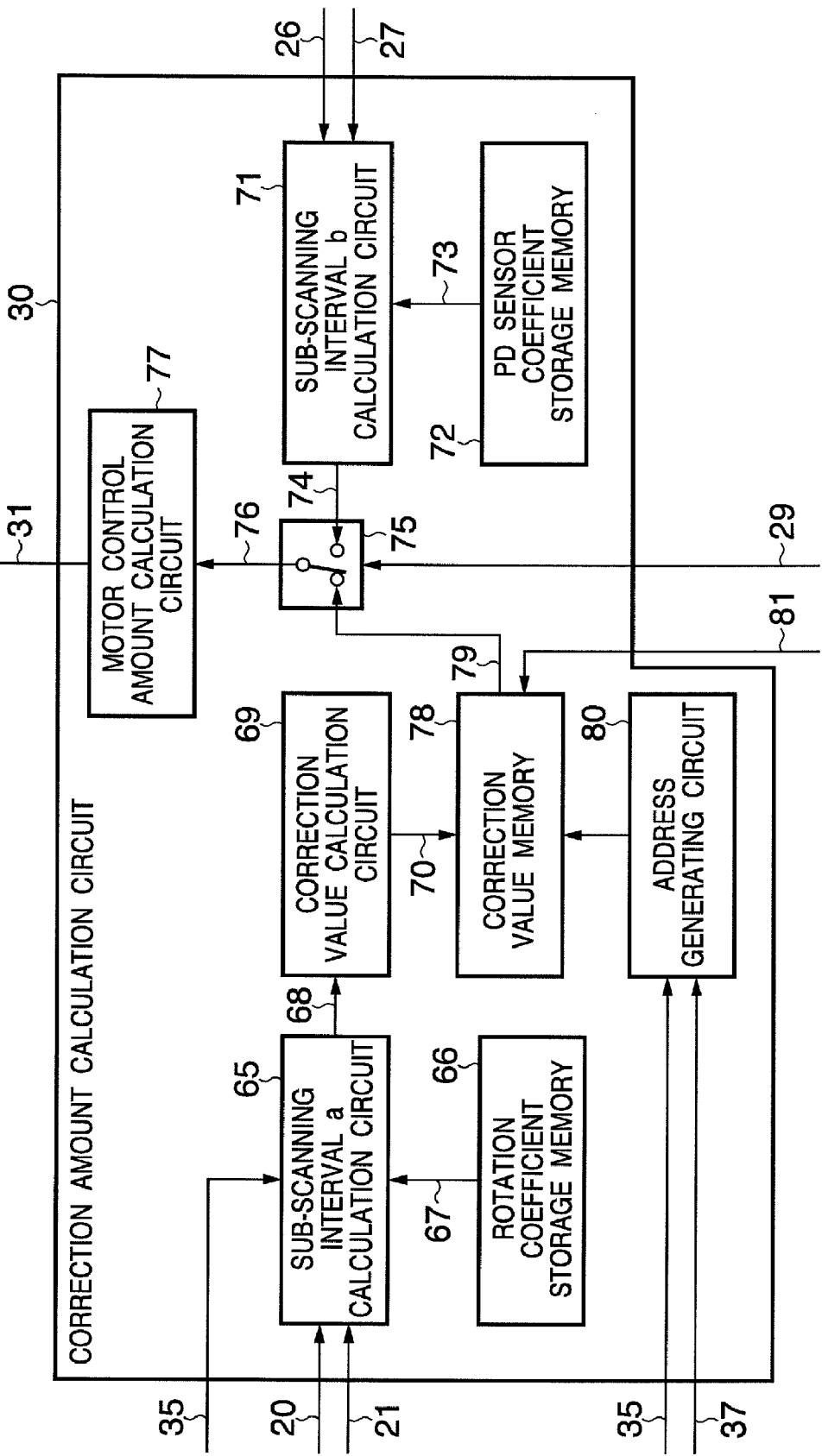
FIG. 7 is a block diagram showing the arrangement of a correction amount calculation circuit according to the first embodiment.

FIG. 7 is a block diagram showing the arrangement of the correction amount calculation circuit 30 in the first embodiment. The correction amount calculation circuit 30 includes a sub-scanning interval a calculation circuit 65, rotation coefficient storage memory, correction value calculation circuit 69, sub-scanning interval b calculation circuit 71, PD sensor coefficient storage memory 72, switch 75, motor control amount calculation circuit 77, correction value memory 79, and address generating circuit 80.

The sub-scanning interval a calculation circuit 65, rotation coefficient storage memory, and correction value calculation circuit 69 calculate a correction value by using the velocity determination signal 20 and the frequency error signal 21 which represent the shift of the rotational velocity of the photosensitive drum with respect to a reference value. This correction value is a value for correcting sub-scanning pitch unevenness due to the rotation unevenness of the rotating photosensitive drum 11.

A correction value memory 78 stores the calculated correction value. The address generating circuit 80 receives the detection start signal 35 and the rotation detection signal 37, generates the initial value of an address in the memory 78 at the time of the start of detection, and inputs the value to the memory 78, thereby incrementing the address in synchronism with the rotation detection signal 37. The memory 78 also receives a read/write signal 81 from the image formation control unit. A correction value for rotation unevenness is calculated at the time of, for example, power-on of the image forming apparatus and is stored in the correction value memory 78. At the time of storage of the correction value, therefore, the read/write signal 81 is set to "write". For this reason, the correction value memory 78 stores the correction value at the rotation phase of the photosensitive drum 11 at an address corresponding to the rotation phase. At the time of image formation, the read/write signal 81 is set to "read". The switch 75 is switched to the correction value memory 78. Therefore, the motor control amount calculation circuit 77 reads out, in accordance with the rotation phase of the photosensitive drum 11, the correction value which is written in the correction value memory 78 in accordance with the rotation phase of the photosensitive drum 11. As a result, the optical unit 4 is driven in accordance with the rotation of the photosensitive drum during image formation to correct rotation unevenness.

The sub-scanning interval b calculation circuit 71 and the PD sensor coefficient storage memory 72 calculate a correction value by using the sub-scanning difference signal 26 and the scanning determination signal 27 which represent a beam interval. This correction value is a value for correcting the beam interval of a plurality of (two in this case) semiconductor lasers.

The switch 75 selectively outputs one of an output signal from the sub-scanning interval b calculation circuit 71 and an output signal from the correction value calculation circuit 69 in accordance with a correction control signal 29 input from the image formation control unit (not shown). The motor control amount calculation circuit 77, which receives this output signal, outputs the motor control signal 31 for determining the moving amount of the optical motor unit 5 to the optical motor driving circuit 32.

Figure 8:
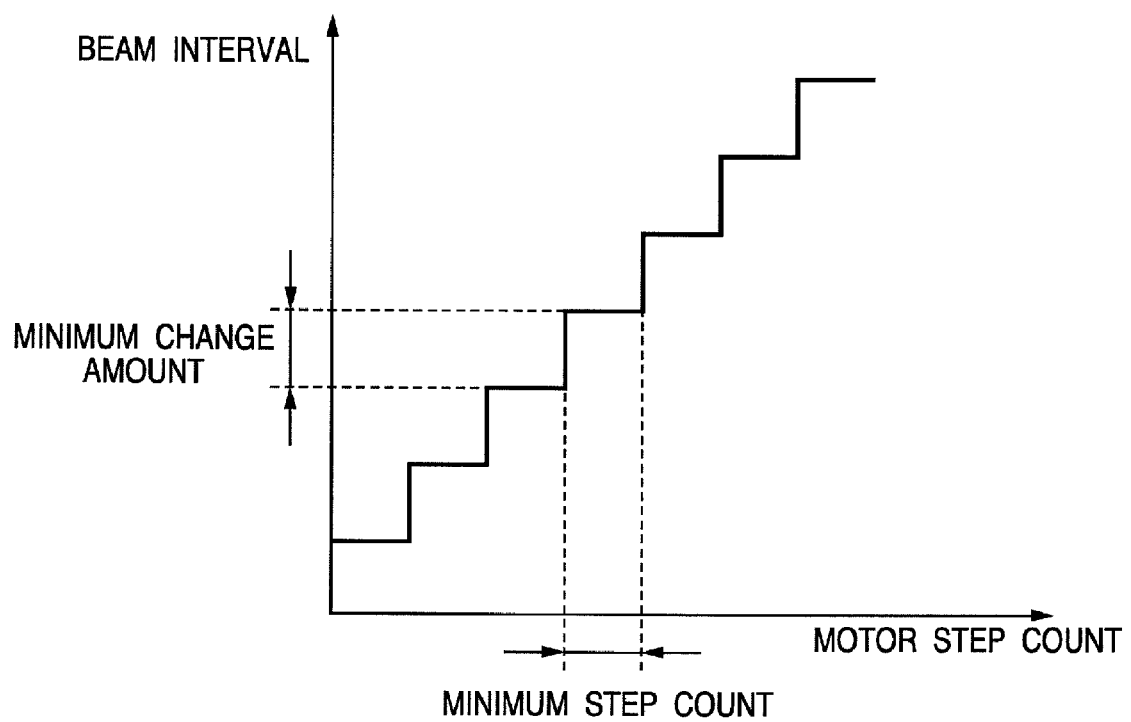
FIG. 8 is a graph showing the relationship between the number of motor steps of an optical motor unit 5 and the sub-scanning moving amount according to the first embodiment.

FIG. 8 is a graph showing the relationship between the number of motor steps of the optical motor unit 5 and the amount of sub-scanning movement. The optical motor unit 5 comprises a step motor (not shown), the driving shaft of the optical unit 4, and a gear which drives the driving shaft in accordance with the rotation of the motor. The gear ratio is set to make the amount of change in beam interval which corresponds to one driving step of the motor become sufficiently smaller than a predetermined (i.e., proper) scanning line interval. If, for example, the resolution in the sub-scanning direction is 600 dpi, the scanning line interval is 42.34 [μm]. Assume that in this case, the amount of change in beam interval per motor 1 step of the optical motor unit 5 is about 4 [μm] (about 1/10 of the sub-scanning interval). The gear ratio is set in this manner.

The motor control amount calculation circuit 77 calculates the number of driving steps of the optical motor unit 5 by using one of output signals from the sub-scanning interval b calculation circuit 71 and correction value calculation circuit 69 which is selected by the switch 75, and determines a driving direction. The motor control amount calculation circuit 77 then outputs the motor control signal 31 for driving the motor by the calculated number of steps. The optical motor unit 5 rotates/drives the optical unit 4 in accordance with the motor control signal 31. This changes the positions of light beams emerging from the optical unit 4 in the height direction and changes the beam interval on the photosensitive drum 11.

<Operation of Correction Calculation Circuit>

Figure 9:
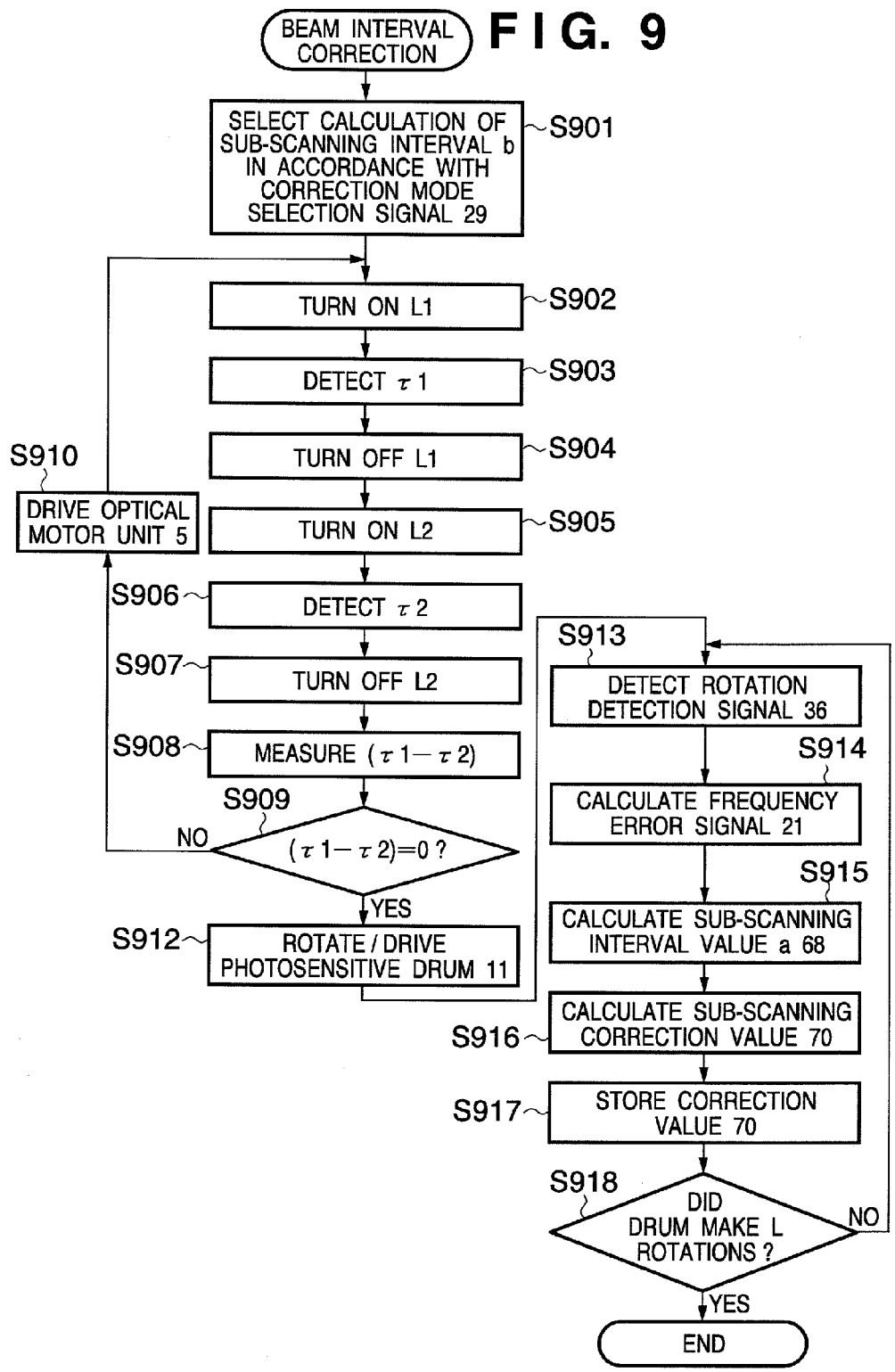
FIG. 9 is a control flowchart of the correction amount calculation circuit according to the first embodiment.

FIG. 9 is a control flowchart for the correction calculation circuit in the first embodiment. The image formation control unit (not shown) executes this procedure when, for example, the power supply is turned on. The image formation control unit waits until at least the optical scanning unit shown in FIG. 1, of the image forming apparatus, can operate for normal image formation. For example, the image formation control unit waits until the rotating polygon mirror 7 reaches a predetermined velocity. Thereafter, the image formation control unit selects an output signal 74 from the sub-scanning interval b calculation circuit 71 first in accordance with the correction control signal 29 (step S901). The image formation control unit then turns on the semiconductor laser 2 (laser beam L1) (step S902), and obtains the count value 51 (τ1 in FIG. 9) obtained by the counter a 50 based on the signal generated when the beam L1 passes through the photosensor 121 by performing main scanning (step S903). The image formation control unit then turns off the laser 2 (step S904).

Likewise, the image formation control unit turns on the semiconductor laser 3 (laser beam L2) (step S905), and obtains the count value 59 (τ2 in FIG. 9) obtained by the counter b 58 based on the signal generated when the beam L2 passes through the photosensor 122 by performing main scanning (step S906). The image formation control unit turns off the laser 3 (step S907). The reason why the image formation control unit does not simultaneously turn on the lasers 2 and 3 is that the laser beam L1 may pass over the photosensor 122.

The image formation control unit outputs the comparison timing signal 25. With this operation, a latch a 25 latches a count value 50, and the latch b 60 latches a count value b 59. In addition, the comparator 62 calculates the difference between these two values (step S908). The correction amount calculation circuit 30 receives this output. The image formation control unit then inputs this output to the correction amount calculation circuit 30, and drives the motor 5 by the amount calculated by the motor control amount calculation circuit 77, thereby correcting the beam interval to the predetermined interval d. The image formation control unit performs the above operation until the difference obtained by the comparator 62 becomes 0 (step S909). For this reason, the image formation control unit (not shown) preferably has received the output from the comparator 62.

If the correction of the beam interval is complete, the image formation control unit determines a correction amount for the rotation unevenness of the photosensitive drum 11. First of all, the image formation control unit rotates/drives the photosensitive drum 11 (step S912). The frequency error detection circuit 19 described above performs the operation in steps S913 and S914. The sub-scanning interval a calculation circuit 65 and the correction value calculation circuit 69 of the correction amount calculation circuit 30 perform the operation in steps S915 and S916. In step S917, as described above, the image formation control unit stores a correction value at an address corresponding to the rotational phase of the photosensitive drum. The image formation control unit repeats the operation from step S913 to step S917 until the photosensitive drum 11 makes one rotation (step S918).

The image formation control unit reads out the correction value stored in the correction value memory 78 at the time of image formation and uses the value for driving the motor 5. At this time, the switch 75 operates to make the correction value memory output data in accordance with the correction control signal 29.

[Outline of Operation of Sub-Scanning Interval a Calculation Circuit 65]

The sub-scanning interval a calculation circuit 65 will be further described. The sub-scanning interval a calculation circuit 65 calculates a sub-scanning interval value a 68 by multiplying a frequency error signal 21 input from the frequency error detection circuit 19 by a rotation coefficient 67 output from a rotation coefficient storage memory 66. Since the sub-scanning interval value a 68 can be obtained from the following equation, the rotation coefficient 67 is the value obtained by multiplying the period of a counter clock 28 by the rotational velocity of the photosensitive drum 11, i.e., a sub-scanning velocity Vv.

sub-scanning interval value a 68=(frequency error signal 21)×(period [s] of counter clock 28)×(rotational velocity [mm/s] of photosensitive drum 11)

Figure 10:
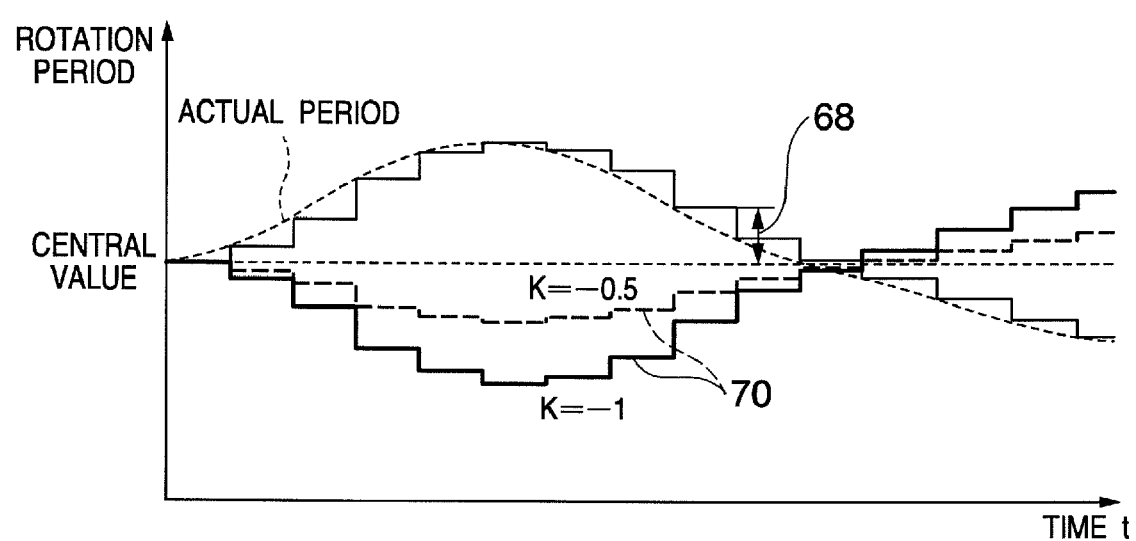
FIG. 10 is a graph showing the operation state of the correction value calculation circuit according to the first embodiment.

FIG. 10 is a graph showing a method of generating a sub-scanning correction value 70. In contrast to the actual rotation frequency of the photosensitive drum 11, the sub-scanning interval value a 68 is the value which is linearly approximated based on the result of the frequency error signal 21. The sub-scanning correction value 70 is the value obtained by multiplying the sub-scanning interval value a 68 by a coefficient k with an inverse characteristic. The coefficient k is the value optimized by conditions such as the load characteristic of the photosensitive drum 11. For example, multiplying the sub-scanning interval value a 68 by coefficient k=−1 or k=−0.5 can obtain a correction value. This value is converted into the direction of rotation and the number of motor steps and stored in the correction value memory 78. The relationship between the number of steps and the correction value, i.e., the amount of change in the position of a scanning line on the surface of the photosensitive drum, changes depending on the optical system. For example, storing the relationship between them in the correction value calculation circuit 69 in the form of a table makes it possible to perform conversion by using the table.

[Outline of Operation of Sub-Scanning Interval b Calculation Circuit 71]

The sub-scanning interval b calculation circuit 71 calculates a sub-scanning interval value b 74 by multiplying the sub-scanning difference signal 26 input from the sub-scanning position detection circuit 24 by a PD sensor coefficient 73 output from the PD sensor coefficient storage memory 72. The sub-scanning interval b calculation circuit 71 outputs the sub-scanning interval value b 74 to the switch 75.

(Method of Setting PD Sensor Coefficient 73)

Figure 11:
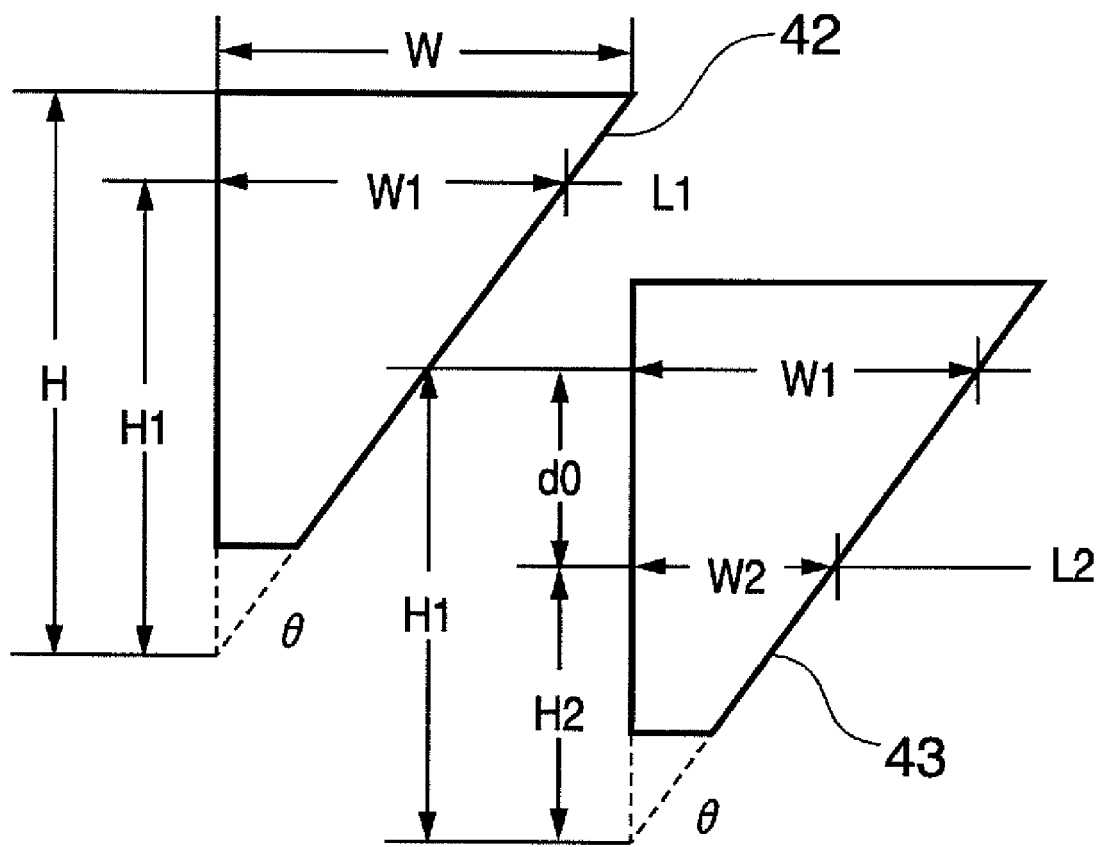
FIG. 11 is a view showing an arrangement to explain a method of setting a PD sensor coefficient according to the first embodiment.

FIG. 11 is a view for explaining the method of setting the PD sensor coefficient 73 in the first embodiment. Letting W1 be the width that the laser beam L1 scans the photosensor 121, W1=Vh×τ1 (Vh: main scanning velocity, and τ1: scanning time). In this case, τ1=(value of latch a output signal 53)×(period of sample clock a 49).

Letting W2 be the width that the laser beam L2 scans the photosensor 122, w2=Vh×τ2 (Vh: main scanning velocity, and τ2: scanning time). In this case, τ2=(value of latch b output signal 61)×(period of sample clock b 57).

The photosensor 121 and the photosensor 122 are equal in shape and size. Therefore, letting W be the width in the main scanning direction, and H be the height in the sub-scanning direction, $H = W/\tan\theta$ Note that each photosensor has a trapezoidal shape having a side x perpendicular to the beam scanning direction. Let θ be the angle defined by the side x and a side crossing the beam scanning direction at an angle other than a right angle.

Letting H1 be the height of the laser beam L1 on the photosensor 121, and H2 be the height of the laser beam L2 on the photosensor 122, $H1 = W1/\tan\theta = (Vh \times \tau1)/\tan\theta$ $H2 = W2/\tan\theta = (Vh \times \tau1)/\tan\theta$ A different d0 between the beam interval between the laser beams L1 and L2 and the proper beam interval d is given by $d0 = H1 - H2 = (W1 - W2)/\tan\theta(\tau1 - \tau2) \times Vh/\tan\theta$ for (τ1−τ2)=sub-scanning difference signal 26

As described above, the PD sensor coefficient 73 is the value obtained by dividing the main scanning velocity Vh by tan θ which is the geometric value of the photosensor 121 and photosensor 122.

As described above, according to this embodiment, driving the optical unit 4 by using the optical motor unit 5 makes it possible to correct the beam interval and the rotation unevenness of the photosensitive drum.

That is, this apparatus corrects a sub-scanning pitch variation corresponding to the calculated frequency error of the photosensitive drum by rotating/driving the optical unit so as to make the sub-scanning pitch vary in the direction to cancel the variation by the distance by which the variation is canceled.

Figure 19:
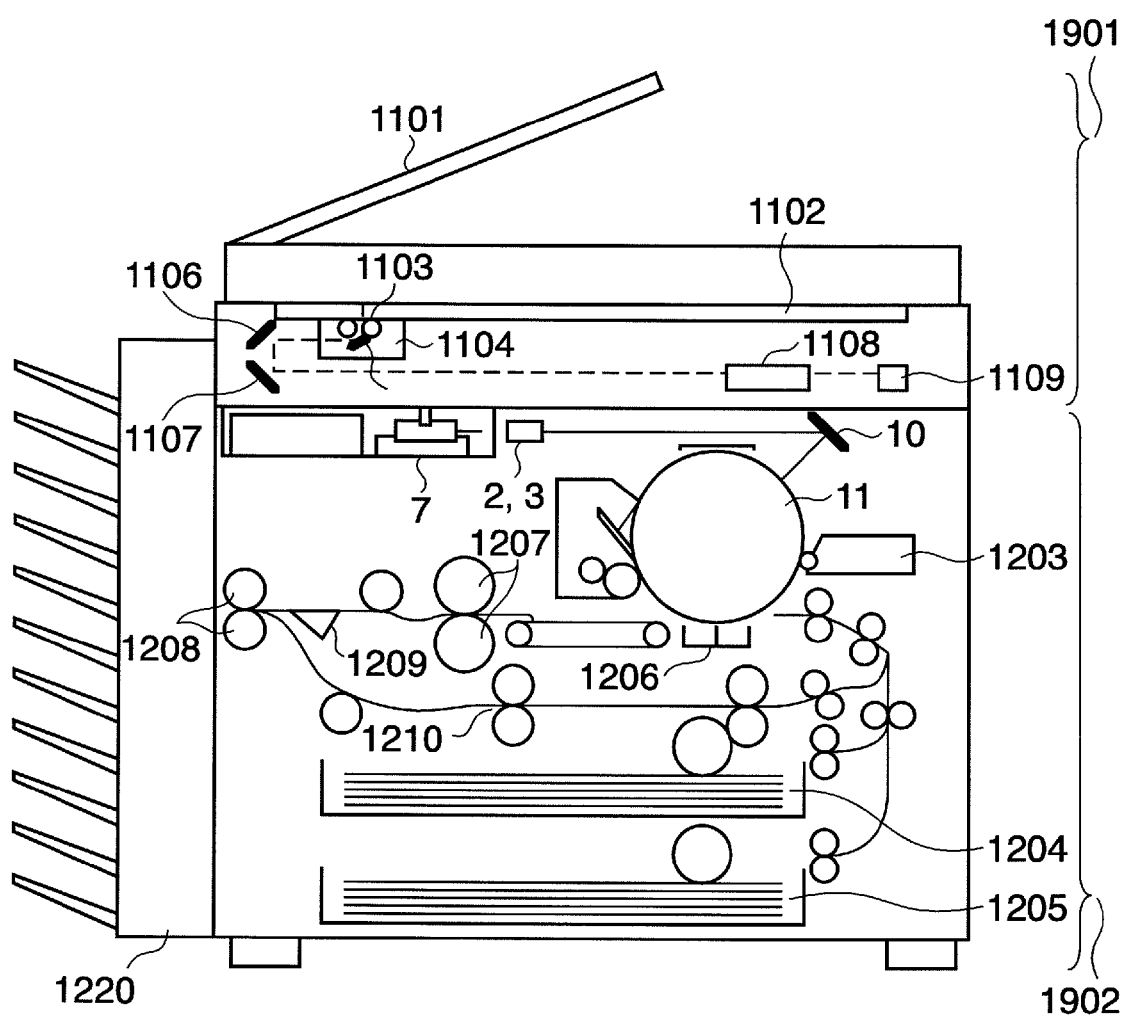
FIG. 19 is a sectional view of an image forming apparatus according to an embodiment.

FIG. 19 shows the overall arrangement of the image forming apparatus. FIG. 19 is a sectional view of a copying machine as the image forming apparatus. FIG. 19 is a sectional view of a reader unit 1901 and printer unit 1902. A document feeder 1101 of the reader unit 1901 sequentially feeds documents from the last page one by one onto a platen glass 1102, and delivers the document on the platen glass 1102 upon completion of read operation on the document. When conveying a document onto the platen glass 1102, the apparatus turns on a lamp 1103 and starts moving a scanner unit 1104, thereby exposing/scanning the document.

Reflected light from the document at this time is guided to a CCD image sensor (to be referred to as a CCD hereinafter) 1109 by mirrors 1105, 1106, and 1107 and a lens 1108. The CCD 1109 reads the image on the document scanned in this manner and outputs image data. Upon performing predetermined processing for the image data, the apparatus transfers the resultant data to the printer unit 1902 and an image formation control unit.

A laser driver 1221 of the printer unit 1902 drives laser emitting units 2 and 3 to make the laser emitting units 2 and 3 emit laser beams corresponding to the image data output from the reader unit 1901. These laser beams strike the photosensitive drum 11 to form a latent image corresponding to the laser beams on the photosensitive drum 11. A developing device 1203 applies a developing agent to the latent image portions on the photosensitive drum 11. The apparatus then feeds a recording sheet from either a cassette 1204 or a cassette 1205 and conveys it to a transfer unit 1206 at the timing synchronized with the start of application of laser beams, thereby transferring the developing agent adhering to the photosensitive drum 11 onto the recording sheet. The apparatus conveys the recording sheet on which the developing agent is transferred to a fixing unit 1207, and fixes the developing agent on the recording sheet by the heat and pressure of the fixing unit 1207. Delivery rollers 1208 deliver the recording sheet passing through the fixing unit 1207. A sorter 1220 stores each recording sheet in a corresponding bin, thereby sorting the recording sheets.

In this embodiment, the apparatus executes the procedure in FIG. 9 when the power supply is turned on. When, for example, the number of printed sheets reaches a predetermined number, the embodiment may execute the procedure in FIG. 9.

Second Embodiment

Figure 12:
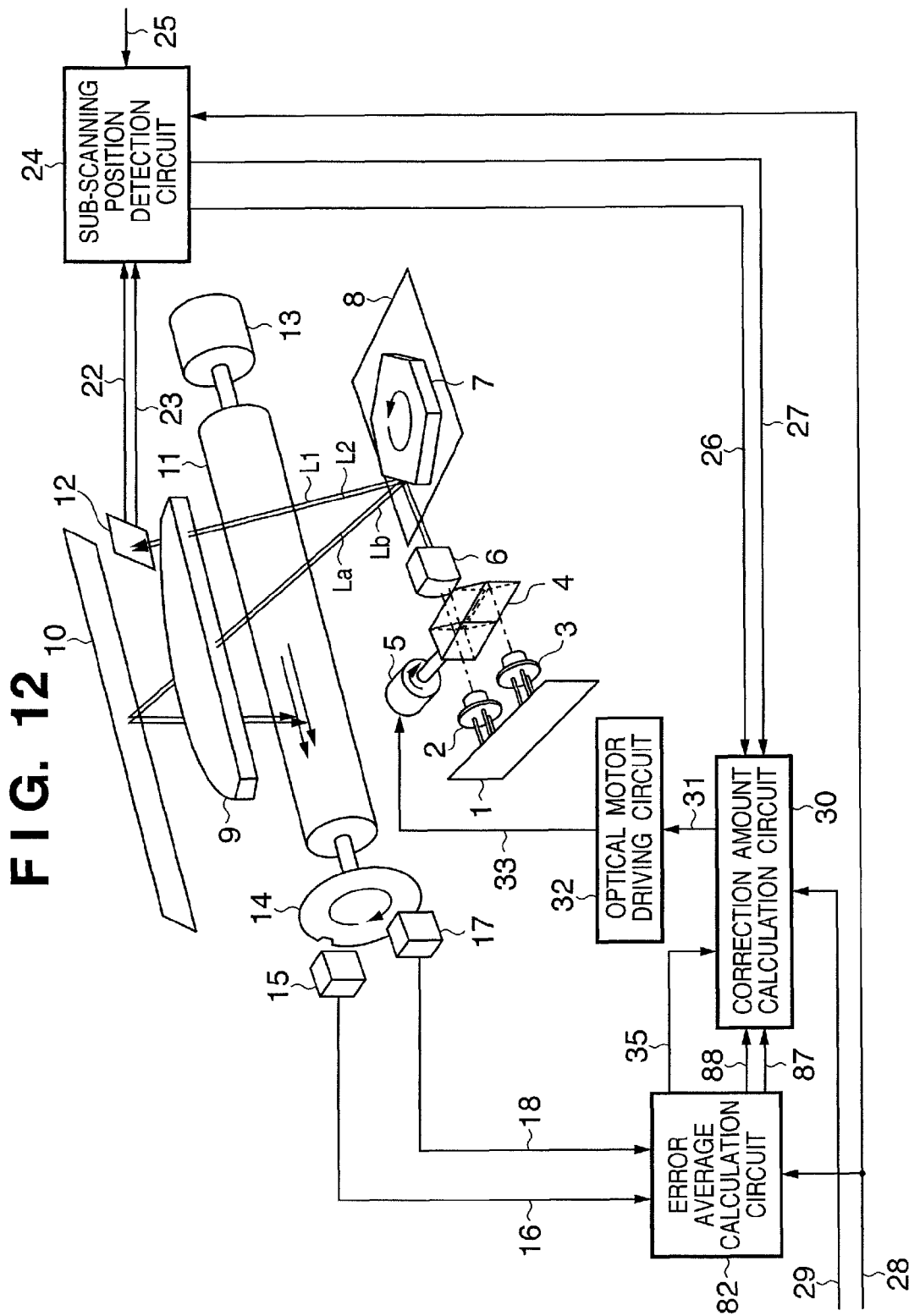
FIG. 12 is a view showing the arrangement of an image forming apparatus including an optical apparatus according to the fourth embodiment.
Figure 13:
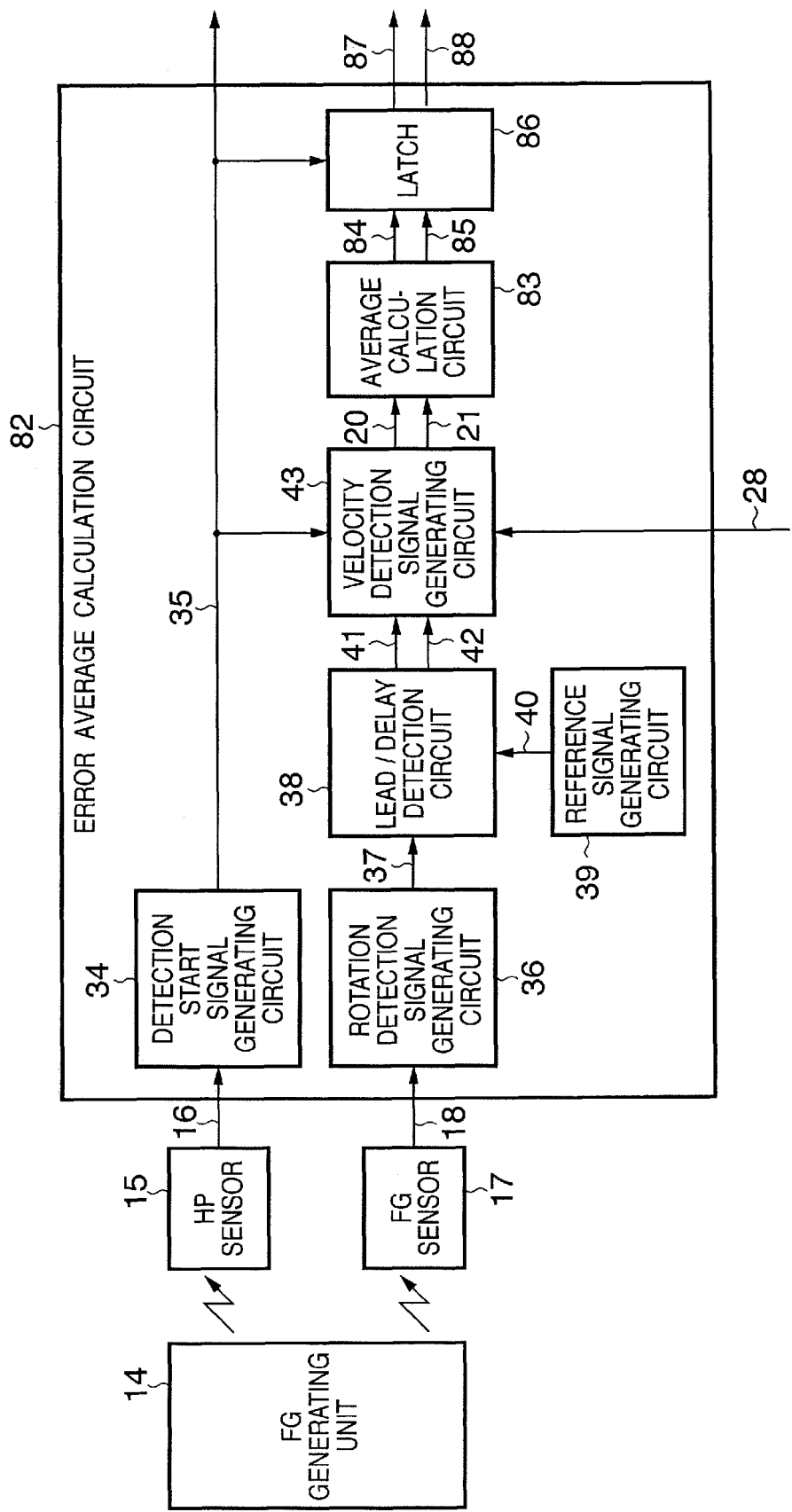
FIG. 13 is a main block diagram of an error average calculation circuit according to the fourth embodiment.
Figure 14:
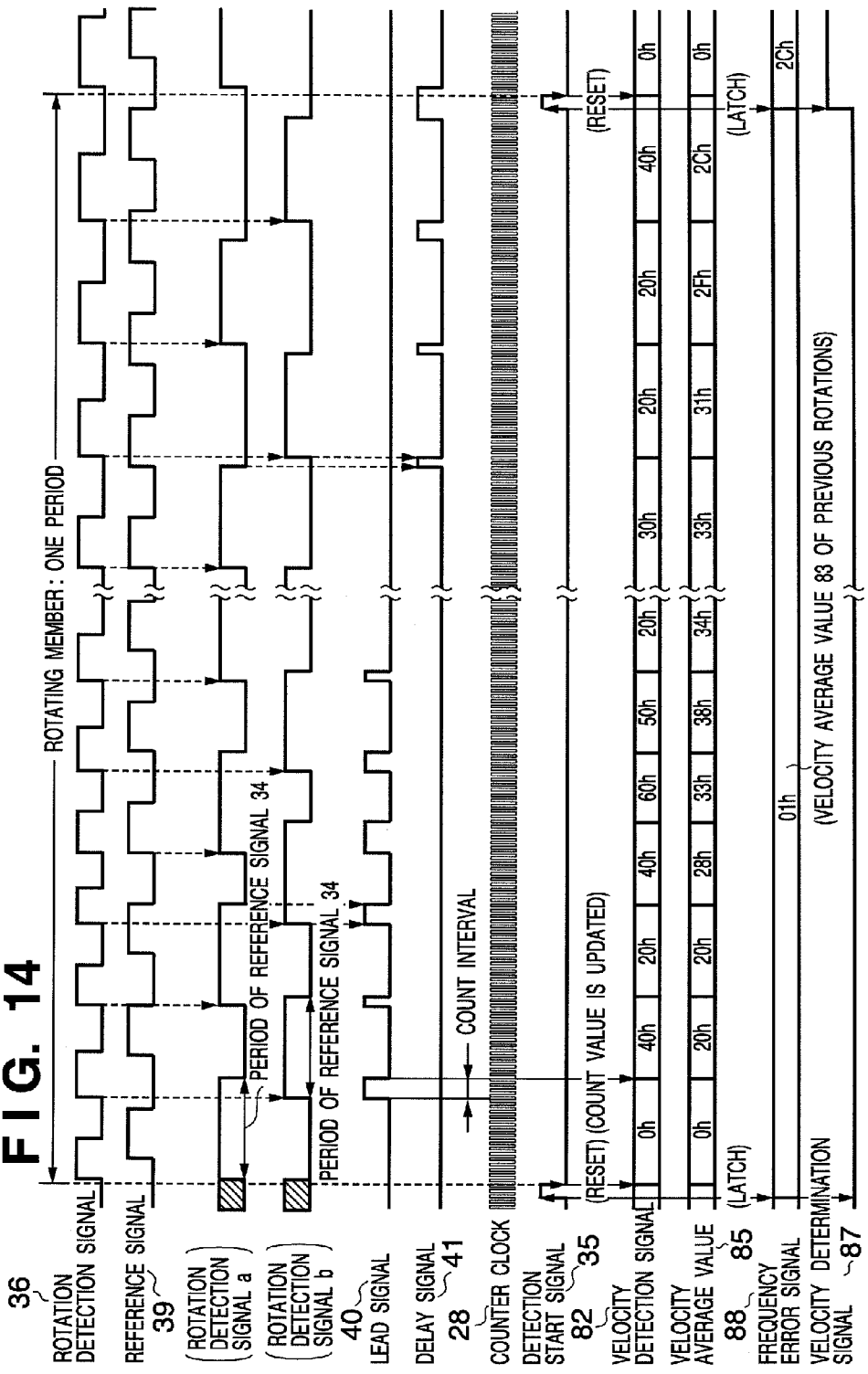
FIG. 14 is a timing chart of the error average calculation circuit according to the fourth embodiment.

FIG. 12 is a view showing the arrangement of an image forming apparatus including an optical scanning unit according to the second embodiment. FIG. 13 is a block diagram of an error average calculation circuit 82. FIG. 14 is a timing chart of the error average calculation circuit 82. This embodiment differs from the first embodiment in that it detects the average of the rotation of the photosensitive drum. The embodiment is the same as the first embodiment in terms of the correction of a beam interval. Signals input from the error average calculation circuit 82 to a correction amount calculation circuit 30 are a velocity error signal 88 and a velocity determination signal 87 instead of the velocity determination signal 20 and the frequency error signal 21.

A rotation detection signal generating unit 14 (to be abbreviated as an FG generating unit hereinafter) is, for example, a disk-like member placed coaxially with the rotating shaft of a photosensitive drum 11. This member has an equidistant pattern of rectangles for detecting a rotation frequency, which are formed on a portion near the periphery. The member also has a detection hole for detecting a write position. A write position sensor 15 (to be abbreviated as an HP sensor) comprises a light-emitting unit and a light-receiving unit. The HP sensor 15 outputs a write position signal 16 (to be abbreviated as an HP signal hereinafter) to a frequency error detection circuit 19 upon detecting the detection hole of the FG generating unit 14. A rotation sensor 17 (to be abbreviated as an FG sensor hereinafter) comprises, for example, a Hall element and the like, and outputs an FG signal 18 to the error average calculation circuit 82 upon detecting a change in current flowing in the equidistant pattern of the FG generating unit 14.

The circuit in FIG. 13 will be described below. The arrangement in FIG. 13 differs from that in FIG. 2 in that an average calculation circuit 83 and a latch 86 are added to the output stage of a velocity detection signal generating circuit 43. A detection start signal generating circuit 34 shapes the HP signal 16 output from the HP sensor 15 to obtain a detection start signal 35. The detection start signal 35 is a signal serving as a start point of the execution of frequency error calculation. A rotation detection signal generating circuit 36 shapes a signal from the rotation (FG) sensor 17 into a rectangular wave to obtain a rotation detection signal 37. A lead/delay detection circuit 38 compares the period of a reference signal 40 input from a reference signal generating circuit 39 with the period of the rotation detection signal 37. If the period of the rotation detection signal 37 is shorter than the period of the reference signal 40, the lead/delay detection circuit 38 determines a lead, and outputs a lead signal 41. If the period of the rotation detection signal 37 is longer than the period of the reference signal 40, the lead/delay detection circuit 38 determines a delay, and outputs a delay signal 42. The velocity detection signal generating circuit 43 comprises a counter and counts the pulse width of the lead signal 41 or delay signal 42 by using a counter clock 28 input from an image formation control unit (not shown). The velocity detection signal generating circuit 43 is reset every time the detection start signal 35 is input. The velocity detection signal generating circuit 43 outputs the count value as the velocity determination signal 20. The velocity detection signal generating circuit 43 outputs the frequency error signal 21 which is at "H" while the lead signal 41 is output, and is at "L" while the delay signal 42 is output.

The average calculation circuit 83 calculates averages every time the velocity determination signal 20 and the frequency error signal 21 input from the velocity detection signal generating circuit 43 are updated, and outputs the averages as an average velocity determination signal 84 and a velocity average value 85. The latch 86 holds the velocity average value 85 at the timing of a leading edge of the detection start signal 35, and outputs the value as the velocity error signal 88. Likewise, the latch 86 holds the average velocity determination signal 84 at the timing of the leading edge of the detection start signal 35, and outputs the value as the average velocity determination signal 87.

FIG. 14 shows the timing of signals. Unlike in the first embodiment, the latch 86 for latching an input value in synchronism with the detection start signal 35 latches the values of the average error and velocity determination signal obtained when the photosensitive drum 11 previously made one rotation. For this reason, the error average calculation circuit keeps outputting the latched values while the photosensitive drum 11 makes one rotation. Therefore, the correction amount calculation circuit 30 drives an optical unit 4 to correct an average error that occurs when the photosensitive drum 11 makes one rotation. This makes it unnecessary to store a variation amount for the rotation unevenness of the photosensitive drum, and makes it possible to perform correction in real time. That is, this embodiment need not perform step S192 and the subsequent steps in FIG. 9. For this reason, the embodiment need not include the correction value memory 78 and address generating circuit 80 in FIG. 7, and can directly connect the output of the correction value calculation circuit 69 to the switch 75. Note that the embodiment is the same as the first embodiment in terms of the correction of a beam interval.

In this manner, this embodiment can correct the rotation unevenness of a rotating member such as a photosensitive drum by using the optical unit 4 with the arrangement simpler than that of the apparatus of the first embodiment. In addition, the embodiment can effectively correct a change in rotation frequency over time, in particular.

Note that this embodiment latches the averages of errors every time the photosensitive drum makes one rotation. However, the embodiment may latch such averages every time the photosensitive drum makes a predetermined number of rotations equal to or more than two rotations instead of one rotation, or an odd number of rotations, e.g., 1.5 rotations.

Third Embodiment

Figure 15:
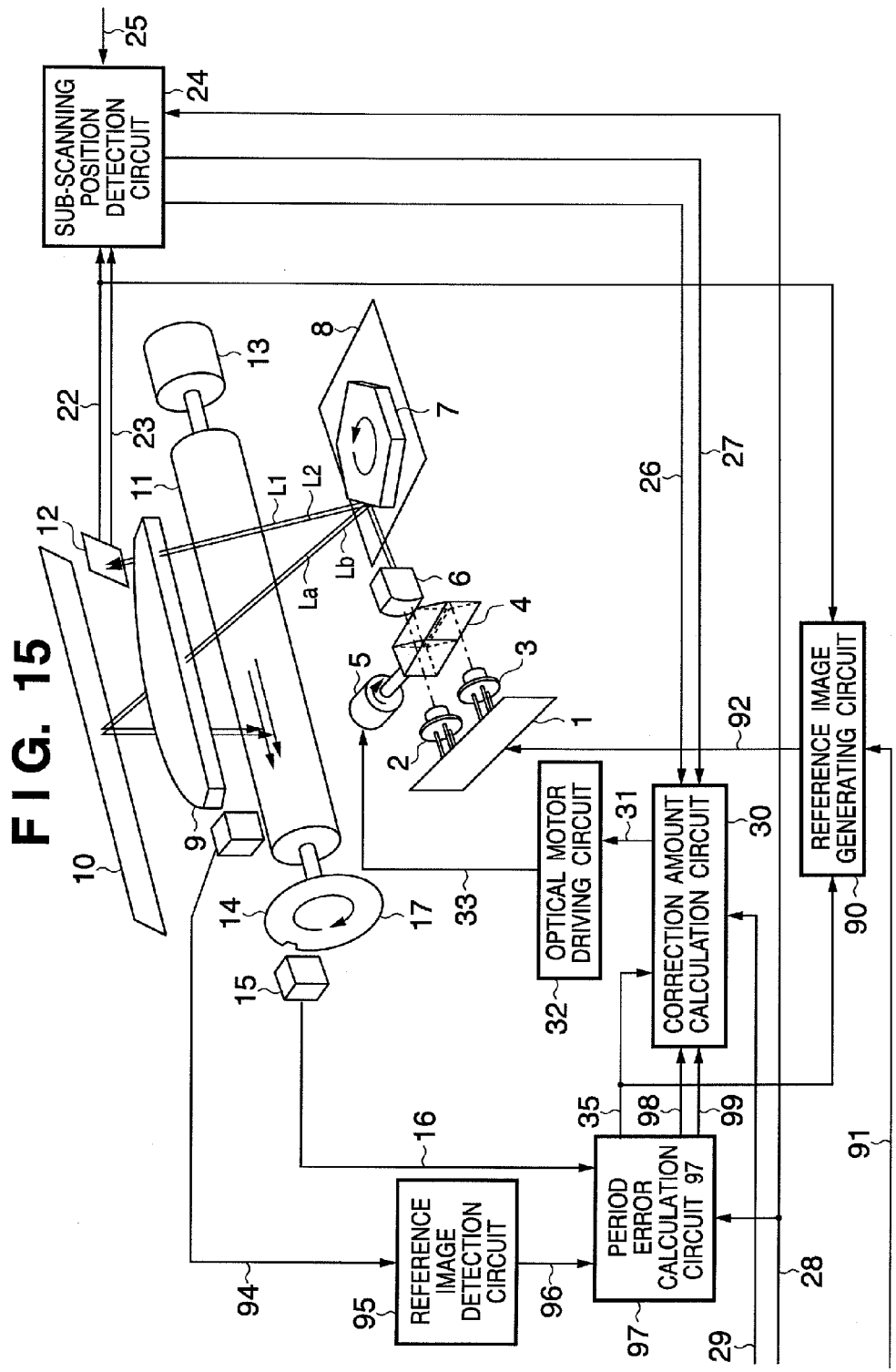
FIG. 15 is a view showing the arrangement of an image forming apparatus including an optical apparatus according to the seventh embodiment.
Figure 16:
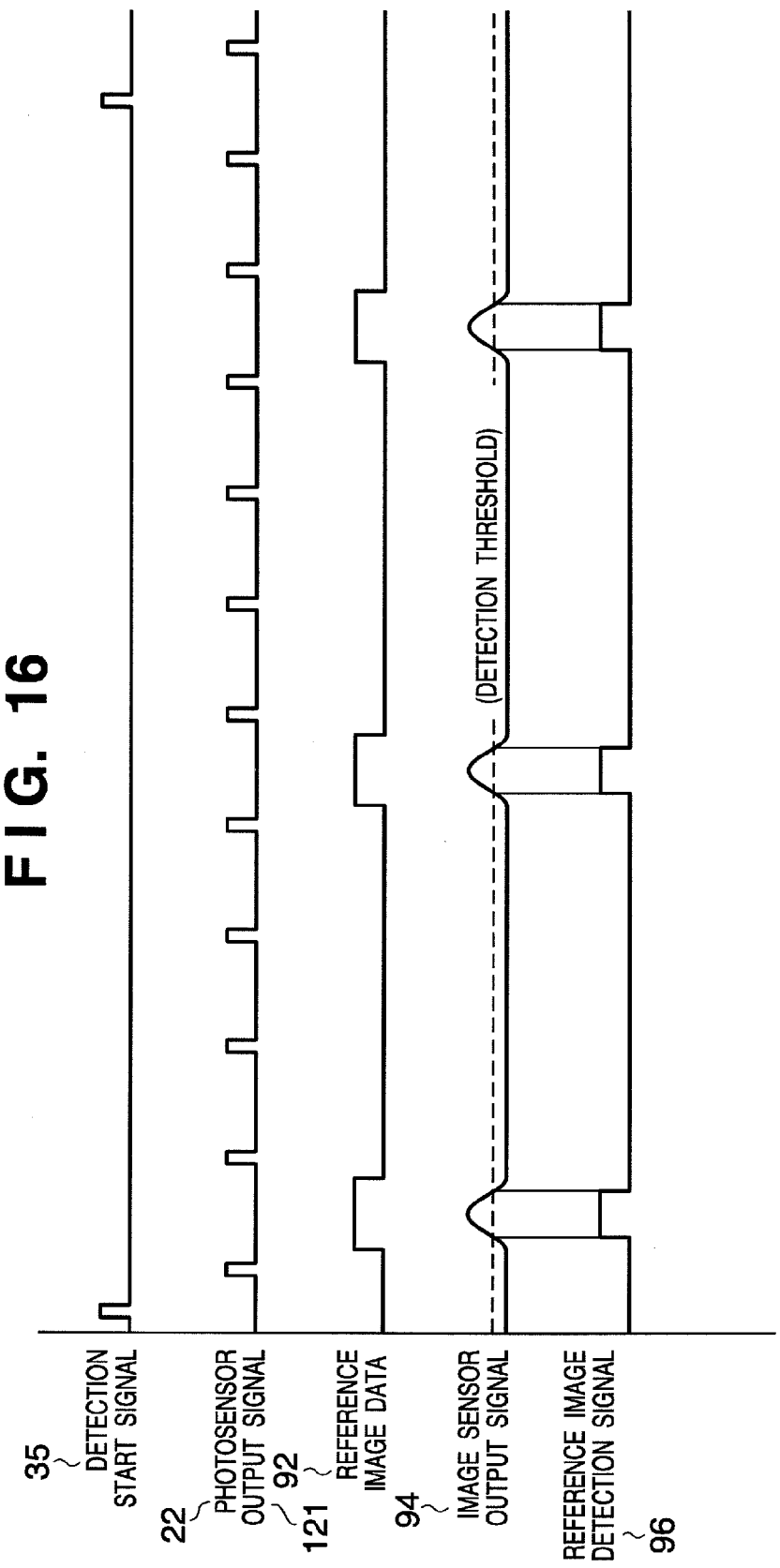
FIG. 16 is a timing chart of an image sensor and reference image detection circuit according to the seventh embodiment.

FIG. 15 is a view showing the arrangement of an optical scanning unit including the third embodiment. FIG. 16 is a timing chart of an image sensor and reference image detection circuit. This embodiment differs from the first embodiment in that it detects the rotation of a photosensitive drum by optically detecting a reference image formed on the photosensitive drum. The third embodiment is the same as the first embodiment in terms of the correction of a beam interval. In addition, the embodiment corrects the rotation unevenness of the photosensitive drum on the basis of a correction amount (or an error amount) obtained and stored at the time of activation in advance as in the first embodiment. Note, however, that a correction amount calculation circuit 30 receives a period error signal 97 and a period determination signal 98 from an error average calculation circuit 82 instead of the velocity determination signal 20 and the frequency error signal 21.

Referring to FIG. 15, a reference image generating circuit 90 generates reference image data 92 for image formation on a photosensitive drum 11 and a recording sheet (not shown) on the basis of an output signal 22 from a photosensor 121. The reference image data 92 is data representing an image having the same period as that of the output signal 22 from the photosensor 121 or having the period (spatial period) obtained by frequency-dividing the period of the output signal 22. It suffices to arbitrarily set a print area in the widthwise direction of the photosensitive drum. Referring to FIG. 16, this apparatus uses, for example, as reference image data, the image obtained by frequency-dividing the period of the output signal 22 from the photosensor 121 by four to set a print area to about 80% of the period of the output signal 22 from the photosensor 121. For example, a stripped pattern of alternate repetition of a black line having a width corresponding to two main scanning lines and a white line having the same width, which are parallel to the main scanning direction, is an image having the above period.

An image generating instruction signal 91 is an image generating instruction signal input from an image formation control unit (not shown). When the image generating instruction signal 91 is output, the reference image generating circuit 90 outputs the reference image data 92 to a laser driving circuit 1 in response to a detection start signal 35. Upon receiving the reference image data 92, the laser driving circuit 1 causes semiconductor lasers 1 and 2 to emit light to form a latent image corresponding to the reference image data 92 on the photosensitive drum 11 and develop the image with toner.

An image sensor 93 comprises, for example, a density sensor and the like, and detects the image pattern developed on the photosensitive drum 11 or a recording sheet with toner in accordance with the reference image data 92. The image sensor 93 is placed at a position on the photosensitive drum 11 at which the sensor can detect the image developed with toner. Referring to FIG. 15, the image sensor 93 detects an image on the drum. If, however, the sensor 93 is placed at a position where it can detect a recording sheet on which an image is recorded, the sensor can detect an image on the recording sheet. A reference image detection circuit 95 shapes an image sensor output signal 94 into a rectangular wave and outputs it as a reference image detection signal 96 to a period error calculation circuit 97.

Figure 17:
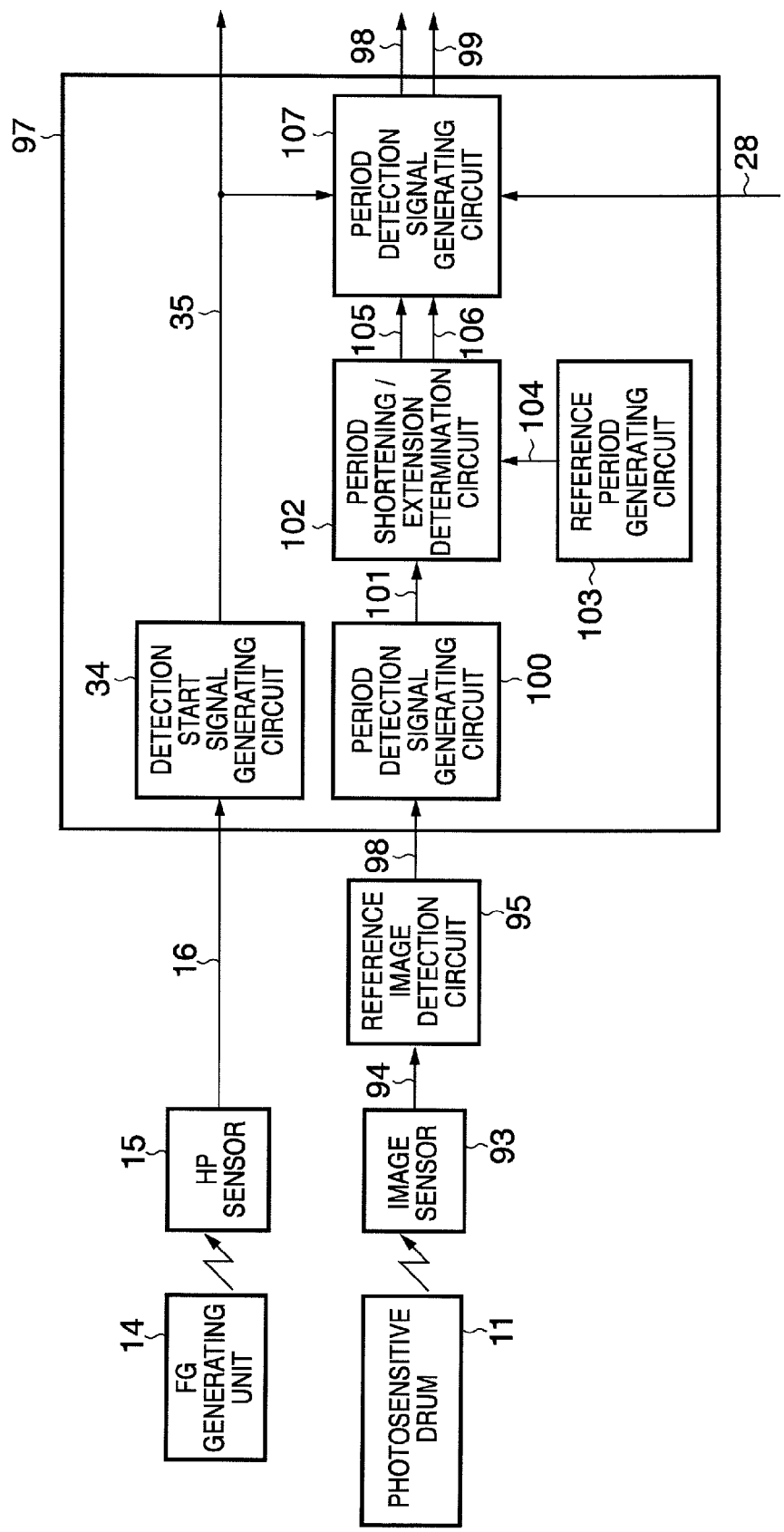
FIG. 17 is a main block diagram of a period error calculation circuit according to the seventh embodiment.
Figure 18:
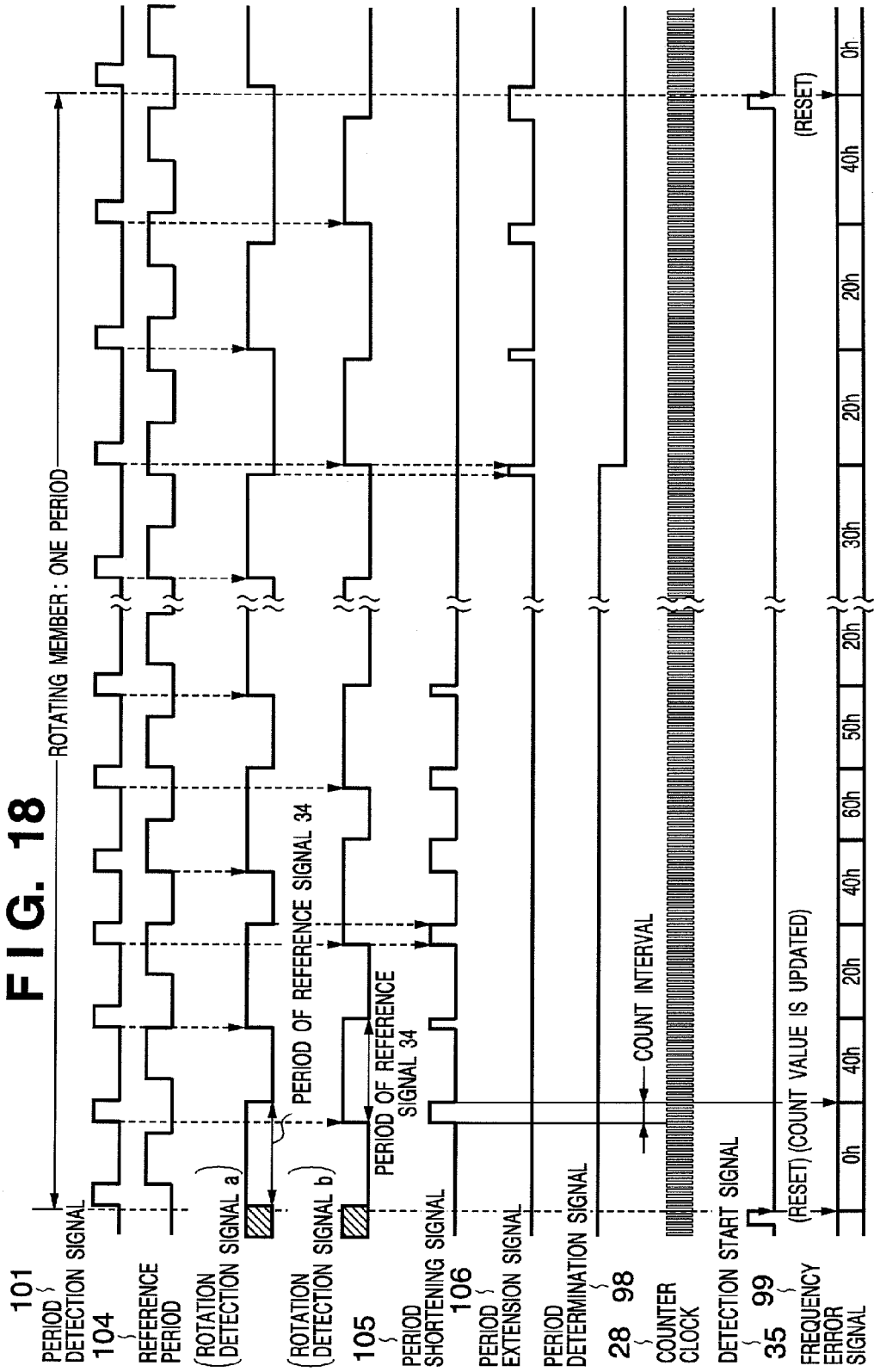
FIG. 18 is a timing chart of the period error calculation circuit according to the seventh embodiment.

FIG. 17 is a block diagram of the period error calculation circuit 97 according to the third embodiment. FIG. 18 is a timing chart of the period error calculation circuit 97. An HP sensor 15 outputs an HP signal 16 to a detection start signal generating circuit 34 in the period error calculation circuit 97 upon detecting the detection hole of an FG generating unit 14. The image sensor 93 detects the reference image on the photosensitive drum 11 and outputs the image sensor output signal 94 to the reference image detection circuit 95. The reference image detection circuit 95 shapes the image sensor output signal 94 and outputs the resultant signal to a period detection signal generating circuit 100 in the period error calculation circuit 97. The detection start signal generating circuit 34 obtains the detection start signal 35 by shaping the HP signal 16 from the HP sensor 15. The detection start signal 35 is a signal serving as a start point of the execution of period error calculation. The period detection signal generating circuit 100 obtains a period detection signal 101 by shaping the reference image detection signal 96 in accordance with an arbitrary duty. A period shortening/extension determination circuit 102 compares a reference period 104 input from a reference period generating circuit 103 with the period detection signal 101. If the period detection signal 101 is shorter than the reference period 104, the period shortening/extension determination circuit 102 determines period shortening, and outputs a period shortening signal 105. If the period detection signal 101 is longer than the reference period 104, the period shortening/extension determination circuit 102 determines period extension and outputs a period extension signal 106.

A period detection signal generating circuit 107 comprises a counter, and counts the pulse width of the period shortening signal 105 or period extension signal 106 by using a counter clock 28 input from an image formation control unit (not shown). The period detection signal generating circuit 107 is reset every time the detection start signal 35 is input. The period detection signal generating circuit 107 outputs a count value as a period error signal 99, and outputs the period determination signal 98 which is at "H" while the period shortening signal 105 is output, and is at "L" while the period extension signal 106 is output.

In the first embodiment, the rotation sensor 17 detects the rotation of the FG generating unit 14 which is coaxial with the photosensitive drum 11. In contrast, this embodiment detects the reference image formed on the photosensitive drum 11. The FG generating unit and the reference image have the same significance in terms of detection of the rotation unevenness of the photosensitive drum 11. Therefore, the correction amount calculation circuit 30, an optical motor driving circuit 32, and a sub-scanning position detection circuit 24 may have the same arrangements as those in the first embodiment. Likewise, the timings of signals shown in FIG. 18 can be understood in the same manner as described in the first embodiment with reference to FIG. 3. Note, however, that the period shortening signal 105 and period extension signal 106 in FIG. 18 need to be read as the lead signal 41 and delay signal 42 in FIG. 3, and the velocity determination signal 20 and frequency error signal 21 need to be read as the period determination signal 98 and period error signal 99.

As described above, according to this embodiment, driving an optical unit 4 by using a motor unit 5 makes it possible to correct a beam interval and the rotation unevenness of the photosensitive drum.

In addition, this embodiment forms and corrects a reference image on the photosensitive drum, and hence can detect the rotation of the photosensitive drum itself and further improve the reliability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-051170, filed Feb. 27, 2006, which is hereby incorporated by reference herein in its entirety.

What is claimed is:

1. An optical scanning apparatus which performs main scanning on a surface of an image bearing member with light beams, and moves light beams in a sub-scanning direction by rotating the image bearing member, comprising:
    an optical unit adapted to collimate optical axes of light beams emitted from a plurality of semiconductor lasers;
    a driving unit adapted to drive said optical unit to change directions of emerging light beams;
    a detection unit adapted to detect a beam interval between a plurality of light beams collimated by said optical unit;
    a first control unit adapted to drive/control said driving unit to make a beam interval detected by said detection unit become a predetermined value;
    a period detection unit adapted to detect a rotation period of the image bearing member;
    an error calculation unit adapted to calculate an error between a period detected by said period detection unit and a reference period; and
    a second control unit adapted to change the directions of the light beams by driving said driving unit in a direction to cancel out a variation in sub-scanning pitch by the light beams which corresponds to an error calculated by said error calculation unit.

2. The apparatus according to claim 1, further comprising a storage unit adapted to store an error calculated by said error calculation unit or a correction value for correcting the error,
    wherein detection of a rotation period by said period detection unit and calculation of an error by said error calculation unit are performed at a predetermined timing, and the error or the correction value is stored in said storage unit, and
    said second control unit drives said driving unit in accordance with the error or the correction value stored in said storage unit.

3. The apparatus according to claim 1, further comprising a holding unit adapted to hold an error calculated by said error calculation unit or a correction value for correcting the error while the image bearing member makes one rotation,
    wherein said error calculation unit calculates an average error or a correction value for every predetermined number of rotations of the image bearing member and causes said holding unit to hold the average error or the correction value, and
    said second control unit drives said driving unit in accordance with the average error or the correction value held in said holding unit.

4. The apparatus according to claim 1, wherein said period detection unit detects a magnetically periodic pattern or a visually periodic pattern provided on a rotating plate mounted axially with a rotating shaft of the image baring member.

5. The apparatus according to claim 1, wherein said period detection unit detects an image having a periodic pattern formed on the image bearing member.

6. An image forming apparatus comprising:
    an optical scanning apparatus defined in claim 1 which forms an image on an image bearing member by using an optical beam modulated with image data, and
    an image fixing unit adapted to transfer and fixes an image formed on the image bearing member onto a recording material.

7. A control method for an optical scanning apparatus which performs main scanning on a surface of an image bearing member with light beams, and moves light beams in a sub-scanning direction by rotating the image bearing member, comprising:
    a detection step of detecting beam interval between a plurality of light beams synthesized by the optical unit;
    a first control step of changing directions of light beams emitted from a plurality of semiconductor lasers by driving/controlling the optical unit which synthesizes optical axes of the light beams to be parallel so as to make a beam interval detected in the detection step become a predetermined value;
    a period detection step of detecting a rotation period of the image bearing member;
    an error calculation step of calculating an error between a period detected in the period detection step with a reference period; and
    a second control step of changing the directions of the light beams by driving/controlling the optical unit in a direction to cancel out a variation in sub-scanning pitch by the light beams which corresponds to an error calculated in the error calculation step.

* * * * *